(12) United States Patent
Kang et al.

(10) Patent No.: US 9,716,877 B2
(45) Date of Patent: Jul. 25, 2017

(54) 3D DISPLAY DEVICE USING BARRIER AND DRIVING METHOD THEREOF

(75) Inventors: Ki-Hyung Kang, Suwon-si (KR);
Dong-Choon Hwang, Suwon-si (KR);
Sang-Moo Park, Yongin-si (KR);
Jung-Hoon Yoon, Suwon-si (KR);
Soo-Bae Moon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 553 days.

(21) Appl. No.: 13/877,223

(22) PCT Filed: Sep. 30, 2011

(86) PCT No.: PCT/KR2011/007287
§ 371 (c)(1),
(2), (4) Date: Apr. 1, 2013

(87) PCT Pub. No.: WO2012/044130
PCT Pub. Date: Apr. 5, 2012

(65) Prior Publication Data
US 2014/0192172 A1  Jul. 10, 2014

Related U.S. Application Data

(60) Provisional application No. 61/388,793, filed on Oct. 1, 2010, provisional application No. 61/429,563, filed
(Continued)

(51) Int. Cl.
*G02F 1/133* (2006.01)
*G02F 1/1335* (2006.01)
(Continued)

(52) U.S. Cl.
CPC ....... *H04N 13/045* (2013.01); *G02B 27/2214* (2013.01); *G02F 1/13306* (2013.01);
(Continued)

(58) Field of Classification Search
CPC .......... H04N 13/0497; H04N 13/0296; H04N 13/0468; H04N 2013/0081;
(Continued)

(56) References Cited

U.S. PATENT DOCUMENTS 5,969,850 A * 10/1999 Harrold .............. G02B 27/2214
348/E13.004
6,094,216 A    7/2000 Taniguchi et al.
(Continued)

FOREIGN PATENT DOCUMENTS

CN    1893672 A    1/2007
CN    1988677 A    6/2007
(Continued)

OTHER PUBLICATIONS

Communication dated Sep. 25, 2015 issued by the State Intellectual Property Office of P.R. China in counterpart Application No. 201180047804.1.
(Continued)

*Primary Examiner* — Huyen Ngo
(74) *Attorney, Agent, or Firm* — Sughrue Mion, PLLC

(57) ABSTRACT

A 3D display apparatus is provided, which includes a display panel which displays a multi-viewpoint image, a barrier arranged on one side of the display panel unit, and a controller which controls the barrier to alternately form light transmitting areas and light blocking areas. The barrier includes a liquid crystal layer, a plurality of upper electrodes arranged to be spaced apart from one another on an upper surface of the liquid crystal layer, and a plurality of lower electrodes arranged to be spaced apart from one another on a lower surface of the liquid crystal layer.

27 Claims, 25 Drawing Sheets

Related U.S. Application Data on Jan. 4, 2011, provisional application No. 61/499,416, filed on Jun. 21, 2011, provisional application No. 61/499,385, filed on Jun. 21, 2011, provisional application No. 61/499,301, filed on Jun. 21, 2011.

(51) Int. Cl.
  *H04N 13/04* (2006.01)
  *G02B 27/22* (2006.01)
  *G09G 3/20* (2006.01)
  *G09G 3/00* (2006.01)
  *H04N 19/48* (2014.01)

(52) U.S. Cl.
  CPC ............. *G09G 3/003* (2013.01); *G09G 3/20* (2013.01); *H04N 13/0413* (2013.01); *H04N 19/48* (2014.11); *G09G 2320/0209* (2013.01); *G09G 2320/0261* (2013.01)

(58) Field of Classification Search
  CPC .......... H04N 13/0018; H04N 13/0029; H04N 13/0225; H04N 13/0059; H04N 13/0282; H04N 13/0409; H04N 13/0477; G09G 3/003
  USPC ............. 349/33; 359/462, 245; 348/55, 81
  See application file for complete search history.

(56) References Cited

U.S. PATENT DOCUMENTS

| | | | | |
|---|---|---|---|---|
| 6,111,560 | A * | 8/2000 | May | G09G 3/342 345/102 |
| 7,359,105 | B2 * | 4/2008 | Jacobs | G02F 1/1323 345/102 |
| 7,483,209 | B2 | 1/2009 | Nam et al. | |
| 7,724,222 | B2 * | 5/2010 | Tajiri | H04N 13/0033 345/6 |
| 7,733,296 | B2 | 6/2010 | Lee et al. | |
| 8,018,482 | B2 | 9/2011 | Kim et al. | |
| 2004/0263968 | A1 * | 12/2004 | Kobayashi | G02B 27/2235 359/462 |
| 2007/0019291 | A1 | 1/2007 | Nam et al. | |
| 2007/0046564 | A1 | 3/2007 | Kim et al. | |
| 2007/0115230 | A1 | 5/2007 | Tajiri et al. | |
| 2007/0126967 | A1 | 6/2007 | Choi et al. | |
| 2007/0146233 | A1 | 6/2007 | Lee et al. | |
| 2007/0183015 | A1 * | 8/2007 | Jacobs | G02F 1/1323 359/245 |
| 2010/0039573 | A1 | 2/2010 | Park et al. | |
| 2013/0057539 | A1 * | 3/2013 | Kim | H04N 13/0409 345/419 |
| 2015/0077526 | A1 * | 3/2015 | Kim | H04N 13/0402 348/51 |

FOREIGN PATENT DOCUMENTS

| | | |
|---|---|---|
| CN | 101533169 A | 9/2009 |
| JP | 3-119889 A | 5/1991 |
| JP | 09-074574 A | 3/1997 |
| JP | 2857429 B2 | 2/1999 |
| JP | 2001092426 A | 4/2001 |
| JP | 2004271617 A | 9/2004 |
| JP | 2007058173 A | 3/2007 |
| JP | 2007164116 A | 6/2007 |
| JP | 2007293270 A | 11/2007 |
| KR | 10-2006-0096844 A | 9/2006 |
| KR | 10-0828696 B1 | 5/2008 |
| KR | 10-0910922 B1 | 8/2009 |
| KR | 10-2010-0021906 A | 2/2010 |

OTHER PUBLICATIONS

Communication, Issued by the European Patent Office, Dated Sep. 30, 2014, In counterpart European application No. 11829636.7.
Communication dated Jun. 2, 2015, issued by the Japanese Patent Office in counterpart Japanese Patent Application No. 2013-531504.
Communication issued Mar. 1, 2016, issued by the Japanese Patent Office in counterpart Japanese Patent Application No. 2013-531504.
International Search Report (PCT/ISA/210) dated Mar. 27, 2012, issued in International Application No. PCT/KR2011/007287.
Communication issued on Dec. 31, 2014 by The State Intellectual Property Office of P.R. China in related application No. 201180047804.1.
Communication dated Nov. 29, 2016 issued by the Japanese Patent Office in counterpart Japanese Patent Application No. 2013-531504.

* cited by examiner

FIG. 6
| ①②③④ | V1 | V2 | V3 | V4 |
|---|---|---|---|---|
| 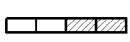 | OFF | ON | OFF | OFF |
| 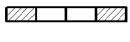 | OFF | OFF | ON | OFF |
|  | OFF | OFF | OFF | ON |
|  | ON | OFF | OFF | OFF |

FIG. 10

| ①②③④ | T_E | T_O | T_C | B_E | B_O | B_C |
|---|---|---|---|---|---|---|
|  | ON | OFF | OFF | OFF | OFF | OFF |
|  | OFF | OFF | OFF | ON | OFF | OFF |
|  | OFF | ON | OFF | OFF | OFF | OFF |
|  | OFF | OFF | OFF | OFF | ON | OFF |

FIG. 15

Odd Frame

| R0 | g1 | B0 | r1 | G0 | b1 |
| L0 | R1 | L0 | R1 | L0 | R1 |

OUTPUT IMAGE

| r0 | G1 | b0 | R1 | g0 | B1 |
| R0 | L1 | R0 | L1 | R0 | L1 |

Even Frame

FIG. 16

Odd Frame

| R0 | g0 | B0 | r1 | G1 | b1 |
| L0 | R0 | L0 | R1 | L0 | R1 |

OUTPUT IMAGE

| r0 | G0 | b0 | R1 | g1 | B1 |
| R0 | L0 | R0 | L1 | R1 | L1 |

Even Frame

FIG. 23
1/120Hz 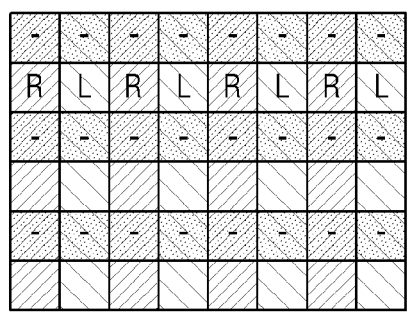
1/120Hz 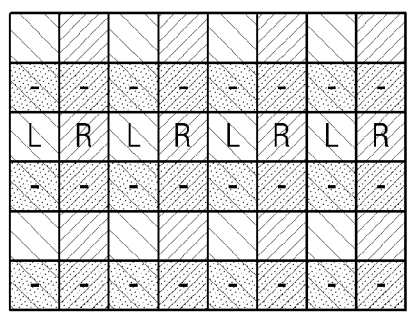
SEPARATION BY VISUAL FIELDS
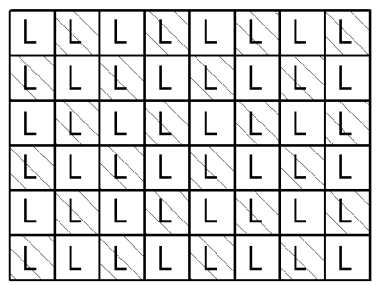 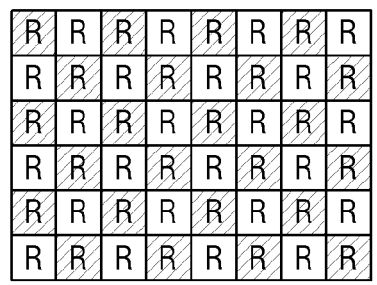

FIG. 24
1/120Hz
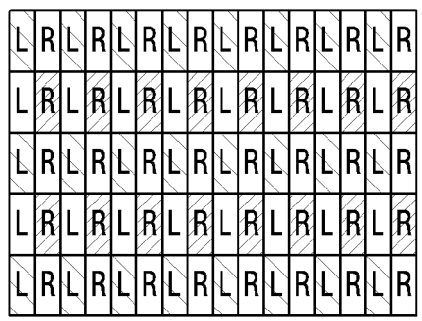
1/120Hz
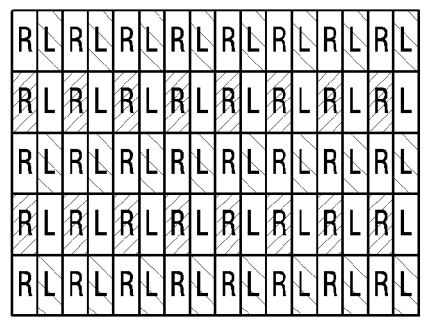
SEPARATION BY VISUAL FIELDS
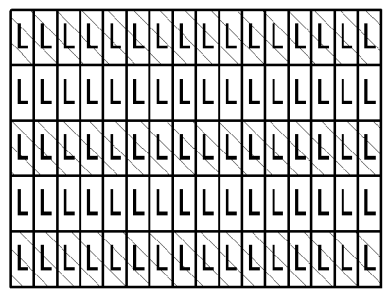

3D DISPLAY DEVICE USING BARRIER AND DRIVING METHOD THEREOF

CROSS-REFERENCE TO RELATED APPLICATIONS

This application is a National Stage application under 35 U.S.C. §371 of PCT/KR2011/007287 filed on Sep. 30, 2011, which claims priority from U.S. Provisional Application Nos. 61/388,793, filed on Oct. 1, 2010, 61/429,563, filed on Jan. 4, 2011, 61/499,301, filed on Jun. 21, 2011, 61/499,385, filed on Jun. 21, 2011, and 61/499,416, filed on Jun. 21, 2011, in the United States Patent and Trademark Office, the disclosures of which are incorporated herein by reference in their entirety.

BACKGROUND

1. Field

Exemplary embodiments relate to a 3D display apparatus and a driving method thereof, and more particularly to a 3D display apparatus using a barrier and a driving method thereof, which make it possible to view a 3D image without 3D glasses.

2. Description of Related Art

With the development of electronic technology, various kinds of electronic devices have been developed and distributed. For example, home appliances including display apparatuses such as a TV are widely used.

In particular, 3D display apparatuses which enable users to view 3D images have recently been developed and put into use in a growing number of homes. The 3D display apparatuses may be divided into a glasses type system and a non-glasses type system depending on whether the 3D apparatuses adopt glasses for viewing 3D images.

An example of the glasses type system may be a shutter glasses type display apparatus. The shutter glasses type display apparatus alternately opens and closes left and right shutters of 3D glasses that a user wears in association with an alternate output of left-eye images and right-eye images to enable the user to perceive a 3D effect.

The non-glasses type system is also called an autostereoscopy system. The non-glasses type 3D display apparatus displays spatially shifted multi-viewpoint images and projects light corresponding to different viewpoint images to the left eye and the right eye of a viewer using a parallax barrier technology or a lenticular lens to enable a user to perceive a 3D effect.

The non-glasses type system as described above has an advantage that it enables a user to view a 3D image even without using glasses.

FIG. 1 is a diagram illustrating the operation of a related art display apparatus using a parallax barrier.

Referring to FIG. 1, a barrier 10 is arranged on one side of a display panel 20. The barrier 10 has a plurality of vertical line patterns. Odd lines 'a' and even lines 'b' are alternately driven to be turned on or off.

The display panel 20 displays a frame in which left-eye images L and right-eye images R are alternately arranged in a vertical row direction, and then displays a frame in which the left-eye images and the right-eye images are arranged so that positions of the left-eye images and the right-eye images are inverted.

The barrier 10 switches the driving of the odd lines and the even lines to match the operation of the display panel 20. Accordingly, the left-eye images are continually incident to the left eye of the user, and the right-eye images are continually incident to the right eye of the user, so that the user can perceive the 3D effect.

However, since such a non-glasses type system provides a multi-viewpoint image, a crosstalk phenomenon that the left-eye images and the right-eye images are mixed with each other may occur.

Further, if a user moves his/her position, the right-eye images may be projected onto the left eye of the user and the left-eye images may be projected onto the right eye of the user depending on the position and/or movement to cause the occurrence of an image inversion phenomenon that the left-eye images and the right-eye images are inverted.

Accordingly, there has been a need for a technology that enables a user to effectively view 3D content in a non-glasses type system.

SUMMARY

Aspects of one or more exemplary embodiments address at least the above problems and/or disadvantages and may provide at least the advantages described below. Accordingly, an aspect of an exemplary embodiment provides a display apparatus and a driving method thereof, which can enable a user to effectively view 3D content even without 3D glasses using a barrier having spatially divided electrodes.

According to an aspect of an exemplary embodiment, a 3D display apparatus includes a display panel which outputs a multi-viewpoint image; a barrier arranged on one side of the display panel; and a controller which controls the barrier to alternately form light transmitting areas and light blocking areas. The barrier may include a liquid crystal layer; a plurality of upper electrodes continually arranged to be spaced apart from one another on an upper surface of the liquid crystal layer; and a plurality of lower electrodes continually arranged to be spaced apart from one another on a lower surface of the liquid crystal layer.

The 3D display apparatus according to an aspect of an exemplary embodiment may further include a capturing device which captures an image of a user; and a position sensor which senses a position of the user by using data from the image captured by the capture device.

Here, if the position of the user that is sensed by the position sensor changes and a movement of the user is detected, the controller may sequentially drive the plurality of upper electrodes and the plurality of lower electrodes so that positions of the light transmitting areas are shifted corresponding to a direction of the movement.

The plurality of upper electrodes and the plurality of lower electrodes may be arranged so that predetermined areas of the upper electrodes and the lower electrodes overlap each other through the liquid crystal layer interposed between the upper electrodes and the lower electrodes.

In this case, the barrier may further include a first upper electrode connector formed on one side of the plurality of upper electrodes to electrically connect odd-numbered upper electrodes of the plurality of upper electrodes; a second upper electrode connector formed on the other side of the plurality of upper electrodes to electrically connect even-numbered upper electrodes of the plurality of upper electrodes; a first lower electrode connector formed on one side of the plurality of lower electrodes to electrically connect odd-numbered lower electrodes of the plurality of lower electrodes; and a second lower electrode connector formed on the other side of the plurality of lower electrodes to electrically connect even-numbered lower electrodes of the plurality of lower electrodes.

Further, the controller may sequentially perform supplying a driving signal to one of the first upper electrode connector, the second upper electrode connector, the first lower electrode connector, and the second lower electrode connector and grounding the remaining electrode connectors.

The plurality of upper electrodes may include upper common electrodes repeatedly arranged; and first upper electrodes and second upper electrodes alternately arranged between the upper common electrodes.

Here, the plurality of lower electrodes may include lower common electrodes repeatedly arranged; and first lower electrodes and second lower electrodes alternately arranged between the lower common electrodes, wherein the upper common electrodes and the lower common electrodes are arranged at different positions so as not to overlap each other through the liquid crystal layer interposed between the upper common electrodes and the lower common electrodes, the first upper electrodes and the second upper electrodes are arranged at positions that are opposite to the lower common electrodes through the liquid crystal layer interposed between the first upper electrodes and the second upper electrodes, and the first lower electrodes and the second lower electrodes are arranged at positions that are opposite to the upper common electrodes through the liquid crystal layer interposed between the first lower electrodes and the second lower electrodes.

The controller may shift the positions of the light transmitting areas of the liquid crystal layer depending on the position of the user by repeatedly supplying a driving signal to one of the first upper electrodes, the second upper electrodes, the first lower electrodes, and the second lower electrodes and grounding the remaining electrodes, the upper common electrodes, and the lower common electrodes.

On the other hand, the barrier may further include a first upper electrode connector electrically connecting the first upper electrodes on an upper surface of the liquid crystal layer; a second upper electrode connector electrically connecting the second upper electrodes on the upper surface of the liquid crystal layer; a first lower electrode connector electrically connecting the first lower electrodes on a lower surface of the liquid crystal layer; and a second lower electrode connector electrically connecting the second lower electrodes on the lower surface of the liquid crystal layer.

Here, the upper common electrodes may be connected together in the form of a meander between the first upper electrodes and the second upper electrodes, and the lower common electrodes may be connected together in the form of a meander between the first lower electrodes and the second lower electrodes.

The multi-viewpoint image may include a first frame in which left-eye images and right-eye images are alternately arranged in a first order in a vertical row direction and a second frame in which the left-eye images and the right-eye images are alternately arranged in a second order in the vertical row direction.

Further, the display panel may sequentially display the first frame and the second frame, and the controller may switch the light transmitting areas and the light blocking areas in association with display timing of the first frame and the second frame.

The 3D display apparatus according to an aspect of an exemplary embodiment may further include a capturing device which captures the image of the user; and a position sensor which senses the position of the user by using data captured by the capturing device. If a movement of the user is sensed or detected by the position sensor, the controller may invert the positions of the light transmitting areas and the light blocking areas of the barrier at a time point where a user moves from a normal visual field to an inverse visual field.

Here, if the user's position and/or movement is sensed by the position sensor, the controller may shift a driving period of the barrier for a half period by gradually delaying input timing of driving signals to be applied to the electrodes to be driven from among the plurality of upper electrodes and the plurality of lower electrodes depending on a moving speed of the user.

The controller may increase a size of the light transmitting area.

The 3D display apparatus according to an aspect of an exemplary embodiment may further include a frame processor which forms the first frame and the second frame by combining a plurality of sub-pixels that constitute pixels of the left-eye images and a plurality of sub-pixels that constitute pixels of the right-eye images.

The frame processor may form the first frame and the second frame through distribution of RGB sub-pixels that constitute the pixels of the left-eye images and rgb sub-pixels that constitute the pixels of the right-eye images to the first frame and the second frame, respectively, to be combined as new pixels.

The controller may perform vertical line inversion to perform grouping of the display panel by vertical lines and to apply driving signals having different polarities to respective groups.

The controller may perform one inversion of a frame inversion, a vertical line inversion, a horizontal line inversion, and a dot inversion in at least one frame period.

According to another aspect of an exemplary embodiment, a method of driving a 3D display apparatus includes outputting a multi-viewpoint image through a display panel; and applying a driving signal to at least one of a plurality of upper electrodes and a plurality of lower electrodes so that light transmitting areas and light blocking areas are alternately formed in a barrier which includes a liquid crystal layer, the plurality of upper electrodes arranged to be spaced apart from one another on an upper surface of the liquid crystal layer, and the plurality of lower electrodes arranged to be spaced apart from one another on a lower surface of the liquid crystal layer.

The method of driving a 3D display apparatus according to an aspect of an exemplary embodiment may further include capturing an image of a user; and sensing a position of the user by using data from the captured image.

Here, if the position of the user changes and a movement of the user is detected, the driving step may sequentially drive the plurality of upper electrodes and the plurality of lower electrodes so that positions of the light transmitting areas are shifted corresponding to a direction of the movement.

The plurality of upper electrodes and the plurality of lower electrodes may be arranged so that predetermined areas of the upper electrodes and the lower electrodes overlap each other through the liquid crystal layer interposed between the upper electrodes and the lower electrodes.

Further, the driving step may sequentially perform supplying a driving signal to one of a first upper electrode connector, a second upper electrode connector, a first lower electrode connector, and a second lower electrode connector, which are provided in the barrier unit, and grounding the remaining electrode connectors. Here, the first upper electrode connector may be formed on one side of the plurality of upper electrodes to electrically connect odd-numbered upper electrodes of the plurality of upper electrodes, the second upper electrode connector may be formed on the other side of the plurality of upper electrodes to electrically connect even-numbered upper electrodes of the plurality of upper electrodes, the first lower electrode connector may be formed on one side of the plurality of lower electrodes to electrically connect odd-numbered lower electrodes of the plurality of lower electrodes, and the second lower electrode connector may be formed on the other side of the plurality of lower electrodes to electrically connect even-numbered lower electrodes of the plurality of lower electrodes.

The plurality of upper electrodes may include upper common electrodes repeatedly arranged; and first upper electrodes and second upper electrodes alternately arranged between the upper common electrodes.

The plurality of lower electrodes may include lower common electrodes repeatedly arranged; and first lower electrodes and second lower electrodes alternately arranged between the lower common electrodes.

Here, the upper common electrodes and the lower common electrodes are arranged at different positions so as not to overlap each other through the liquid crystal layer interposed between the upper common electrodes and the lower common electrodes, the first upper electrodes and the second upper electrodes are arranged at positions that are opposite to the lower common electrodes through the liquid crystal layer interposed between the first upper electrodes and the second upper electrodes, and the first lower electrodes and the second lower electrodes are arranged at positions that are opposite to the upper common electrodes through the liquid crystal layer interposed between the first lower electrodes and the second lower electrodes.

The driving step may shift the positions of the light transmitting areas of the liquid crystal layer depending on the position of the user by repeatedly performing supplying of a driving signal to one of the first upper electrodes, the second upper electrodes, the first lower electrodes, and the second lower electrodes and grounding of the remaining electrodes, the upper common electrodes, and the lower common electrodes.

On the other hand, the barrier may further include a first upper electrode connector electrically connecting the first upper electrodes on an upper surface of the liquid crystal layer; a second upper electrode connector electrically connecting the second upper electrodes on the upper surface of the liquid crystal layer; a first lower electrode connector electrically connecting the first lower electrodes on a lower surface of the liquid crystal layer; and a second lower electrode connector electrically connecting the second lower electrodes on the lower surface of the liquid crystal layer.

Here, the upper common electrodes may be connected together in the form of a meander between the first upper electrodes and the second upper electrodes, and the lower common electrodes may be connected together in the form of a meander between the first lower electrodes and the second lower electrodes.

The method of driving a 3D display apparatus according to an aspect of an exemplary embodiment may further include generating a first frame in which left-eye images and right-eye images are alternately arranged in a first order in a vertical row direction and a second frame in which the left-eye images and the right-eye images are alternately arranged in a second order in the vertical row direction.

Here, the output step may sequentially display the first frame and the second frame, and the driving step may switch the light transmitting area and the light blocking area in association with display timing of the first frame and the second frame.

The method of driving a 3D display apparatus according to an aspect of an exemplary embodiment may further include capturing the image of the user; sensing the position of the user by using captured data; and if a movement of the user is sensed, inverting the positions of the light transmitting areas and the light blocking areas of the barrier at a time point where a user moves from a normal visual field to an inverse visual field.

The method of driving a 3D display apparatus according to an aspect of an exemplary embodiment may further include, if the user's position and/or movement is sensed, shifting a driving period of the barrier for a half period by gradually delaying input timing of the driving signals to be applied to the electrodes to be driven from among the plurality of upper electrodes and the plurality of lower electrodes depending on a moving speed of the user.

The method of driving a 3D display apparatus according to an aspect of an exemplary embodiment may further include increasing a size of the light transmitting area.

The generating the multi-viewpoint image may form the first frame and the second frame by combining a plurality of sub-pixels that constitute pixels of the left-eye images and a plurality of sub-pixels that constitute pixels of the right-eye images.

The generating the multi-viewpoint image may form the first frame and the second frame through distribution of RGB sub-pixels that constitute the pixels of the left-eye images and rgb sub-pixels that constitute the pixels of the right-eye images to the first frame and the second frame, respectively, to be combined as new pixels.

The method of driving a 3D display apparatus according to an aspect of an exemplary embodiment may further include performing vertical line inversion to perform grouping of the display panel by vertical lines and to apply driving signals having different polarities to respective groups.

The method of driving a 3D display apparatus according to an aspect of an exemplary embodiment may further include performing one inversion of a frame inversion, vertical line inversion, horizontal line inversion, and a dot inversion in at least one frame period.

According to the various aspects of exemplary embodiments described above, a user can effectively view 3D content even without 3D glasses.

BRIEF DESCRIPTION OF DRAWINGS

The above and other aspects, features and advantages of the exemplary embodiments will be more apparent from the following detailed description when taken in conjunction with the accompanying drawings, in which:

FIGS. 5 and 6 are diagrams illustrating a method of driving a barrier unit in a 3D display apparatus according to an aspect of an exemplary embodiment;

FIG. 10 is a diagram illustrating a method of driving the barrier unit of FIG. 9;

FIGS. 14 to 16 are diagrams illustrating pixels of an output image configured in various methods;

FIGS. 21 to 24 are diagrams illustrating various inversion methods according to various aspects of exemplary embodiments.

DETAILED DESCRIPTION OF EXEMPLARY EMBODIMENTS

Hereinafter, Exemplary embodiments will be described in detail with reference to the accompanying drawings.

Figure 1:
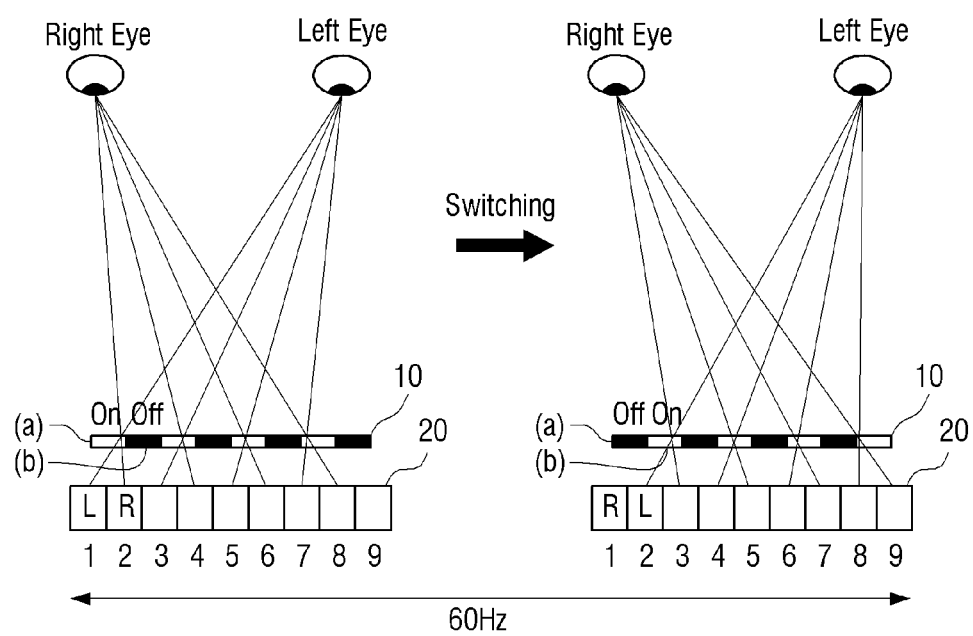
FIG. 1 is a diagram illustrating the operation of a typical non-glasses type system.
Figure 2:
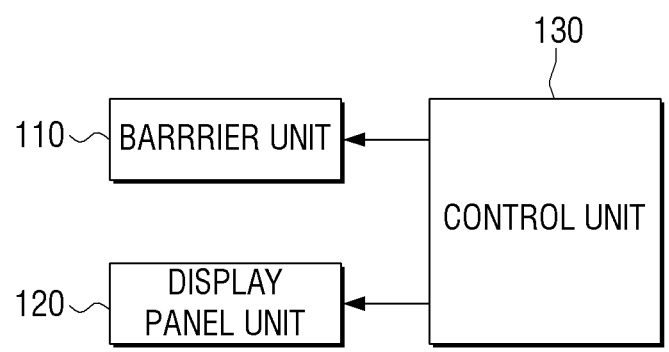
FIG. 2 is a block diagram illustrating the configuration of a 3D display apparatus according to an aspect of an exemplary embodiment.

FIG. 2 is a block diagram illustrating the configuration of a 3D display apparatus according to an aspect of an exemplary embodiment. A 3D display apparatus is an apparatus that displays content in a 3D method so that a user can perceive a 3D effect. The 3D display apparatus may be implemented by various kinds of apparatuses, such as a television (TV), a monitor, a personal computer (PC), a mobile phone, a laptop computer, a tablet PC, a digital photo frame, an e-book, a portable digital assistant (PDA), and the like.

Referring to FIG. 2, the 3D display apparatus includes a barrier unit 110 (e.g., a barrier), a display panel unit 120 (e.g., a display panel), and a control unit 130 (e.g., a controller).

The display panel unit 120 outputs a multi-viewpoint image. The multi-viewpoint image means an image in which images captured from the same object at different angles are combined. For example, one image frame may be formed by repeating alternate arrangement of left-eye images and right-eye images. Further, one image frame may be formed through combination of four or more images. Such a multi-viewpoint image may be provided from an external source, such as a broadcasting station or a web server, or may be provided from an internal or external storage medium or reproducing device.

The barrier unit 110 is arranged on one side of the display panel unit 120 to selectively transmit light corresponding to the multi-viewpoint image. The barrier unit 110 may be arranged on an upper side or a lower side of the display panel unit 120. As a result of the selective transmission of light by the barrier unit, images having different viewpoints are incident to a left eye and a right eye of a user, and thus the user can perceive the 3D effect.

The control unit 130 drives the barrier unit 110 so that light transmitting areas and light blocking areas are formed in the barrier unit 110. The light transmitting areas and the light blocking areas are alternately formed in the barrier unit 110.

The barrier unit may include a liquid crystal layer, a plurality of upper electrodes, and a plurality of lower electrode. The upper electrodes are continually arranged to be spaced apart from one another on an upper surface of the liquid crystal layer, and the lower electrodes are continually arranged to be spaced apart from one another on a lower surface of the liquid crystal layer. The upper electrodes are spaced apart from one another, and thus may be separately driven. In the same manner, the lower electrodes are spaced apart from one another, and thus may be separately driven.

The control unit 130 drives the barrier unit 110 through the application of driving signals to the upper electrodes and the lower electrodes or grounding thereof. An electric potential difference occurs between the electrodes to which the driving signals have been applied and the grounded electrodes, and the liquid crystal layer interposed between the electrodes is turned on to form the light transmitting areas. Otherwise, the liquid crystal layer is turned off to form the light blocking areas. The structure of the barrier unit 110 may be implemented in various ways.

Figure 3:
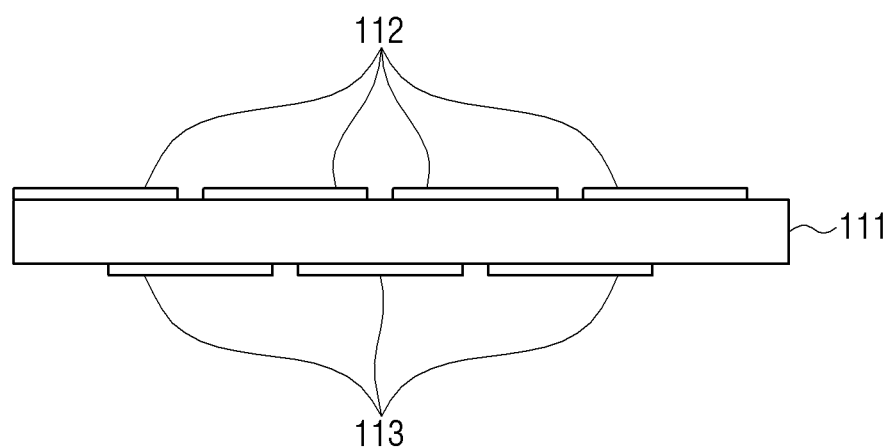
FIGS. 3 and 4 are diagrams illustrating the configuration of a barrier unit according to an aspect of an exemplary embodiment.

FIG. 3 shows the structure of the barrier unit 110 according to an aspect of an exemplary embodiment. Referring to FIG. 3, the liquid crystal layer 111 is in the shape of a plate. The upper electrodes 112 are provided on an upper portion of the liquid crystal layer 111, and the lower electrodes 113 are provided on a lower portion thereof.

The upper electrodes 112 and the lower electrodes 113 are arranged so that parts of the upper electrodes 112 and the lower electrodes 113 overlap each other through the liquid crystal layer 111 interposed between the upper electrodes 112 and the lower electrodes 113. Referring to FIG. 3, about half of each of the lower electrodes 113 and half of each the upper electrodes 112 overlap with each other. The upper electrodes 112 may be electrically separated from each other to be separately controlled by the control unit 130, or parts of the upper electrodes 112 may be electrically connected to each other to be controlled by the control unit 130 in the unit of plural upper electrodes 112. The lower electrodes 113 may be controlled or laid out in a manner similar to or the same as the upper electrodes.

Figure 4:
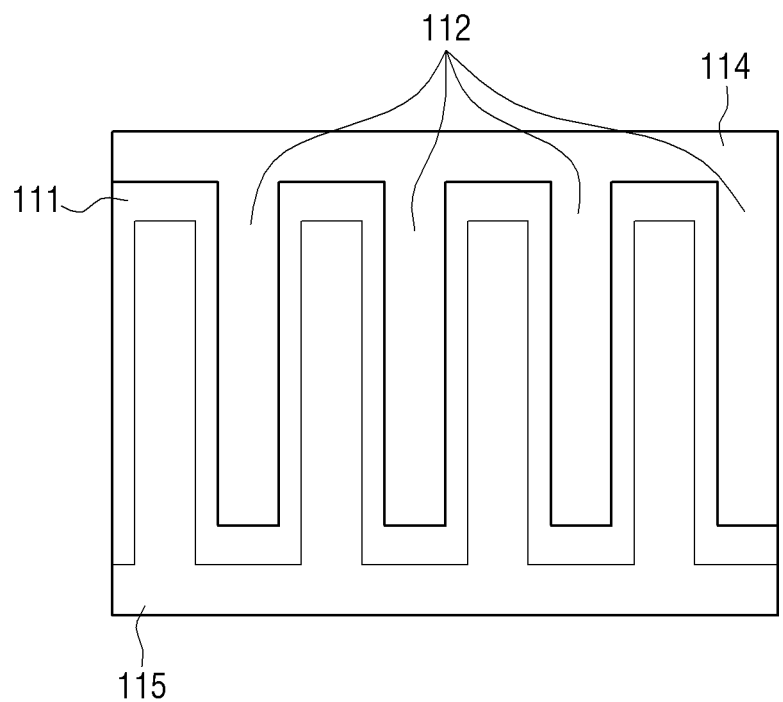

FIG. 4 is a plan view illustrating an example of a connection pattern of the upper electrodes 112. Referring to FIG. 4, the upper electrodes of odd-numbered lines of the plurality of upper electrodes 112 which are spaced apart from each other for a predetermined gap are electrically connected together, and the upper electrodes of even-numbered lines are electrically connected together.

In FIG. 4, a portion in which the odd-numbered upper electrodes are electrically connected together is described as a first upper electrode connection unit 114 (e.g., a first upper electrode connector), and a portion in which the even-numbered upper electrodes are electrically connected together is described as a second upper electrode connection unit 115 (e.g., a second upper electrode connector).

The first upper electrode connection unit 114 is formed on one end side of the upper electrodes on the liquid crystal layer 111, and the second upper electrode connection unit 115 is formed on the other end side of the upper electrodes on the liquid crystal layer 111.

The connection structure of the lower electrodes may be in the shape as shown in FIG. 4. That is, on the lower surface of the liquid crystal layer 111, a first lower electrode connection unit (not illustrated) (e.g., a first lower electrode connector) that is formed on one side of the plurality of lower electrodes 113 to electrically connect the odd-numbered lower electrodes and a second lower electrode connection unit (not illustrated) (e.g., a second lower electrode connector) that is formed on the opposite side to the first lower electrode connection unit through the interposed lower electrodes to electrically connect the even-numbered lower electrodes may be provided.

The control unit 130 may perform supplying the driving signal to one of the first upper electrode connection unit, the second upper electrode connection unit, the first lower electrode connection unit, and the second lower electrode connection unit and grounding the remaining electrode connection units to determine the light transmitting areas and the light blocking areas. For example, if the control unit 130 applies the driving signal to the first upper electrode connection unit and grounds the second upper electrode connection unit, the first lower electrode connection unit, and the second lower electrode connection unit, only the portion of the lower liquid crystal layer 111 of the odd-numbered upper electrodes which are commonly connected to the first upper electrode connection unit is turned on, and the remaining portions are turned off.

By contrast, if the control unit 130 applies the driving signal to the first lower electrode connection unit and grounds the remaining electrode connection units, only the portion of the upper liquid crystal layer 111 of the odd-numbered lower electrodes which are commonly connected to the first lower electrode connection unit is turned on, and the remaining portions are turned off.

The control unit 130 may shift the positions of the light transmitting areas through sequential repetition of the above-described operations, or may invert the positions of the light transmitting areas and the light blocking areas through repetition of the above-described operations in a predetermined pattern.

In the case where the upper electrodes 112 and the lower electrodes 113 are arranged so that the parts thereof overlap each other as illustrated in FIG. 3, the positions of the light transmitting areas can be finely adjusted. The position adjustment of the light transmitting areas will be described referring to FIGS. 5 to 7.

Figure 5:
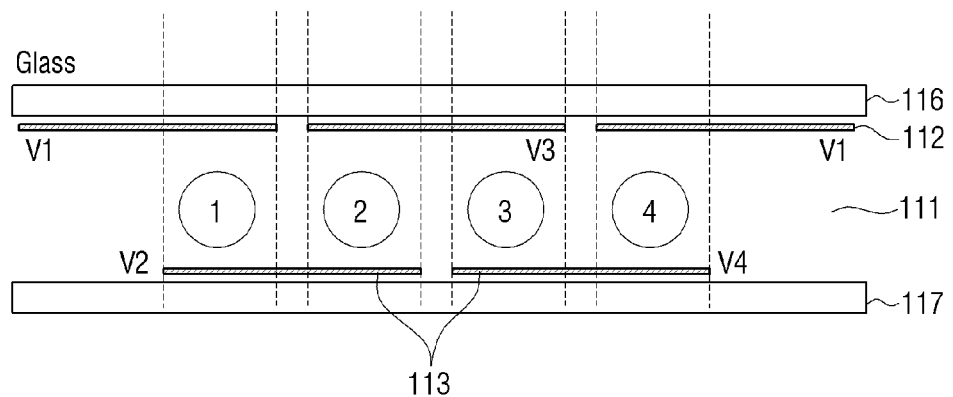

As illustrated in FIG. 5, the upper electrodes 112 and the lower electrodes 113 may be built in the liquid crystal layer 111. A glass substrate 116 may be additionally provided on the upper surface of the liquid crystal layer 111, and a glass substrate 117 may be additionally provided on the lower surface thereof. In FIG. 5, a driving signal that is applied to the odd-numbered upper electrodes is denoted by V1, a driving signal that is applied to the even-numbered upper electrodes is denoted by V3, a driving signal that is applied to the odd-numbered lower electrodes is denoted by V2, and a driving signal that is applied to the even-numbered lower electrodes is denoted by V4. Further, an area of the liquid crystal layer 111 between the odd-numbered upper electrodes and the odd-numbered lower electrodes is denoted by ①, a liquid crystal layer area between the even-numbered upper electrodes and the odd-numbered lower electrodes is denoted by ②, a liquid crystal layer area between the even-numbered upper electrodes and the even-numbered lower electrodes is denoted by ③, and a liquid crystal layer area between the odd-numbered upper electrodes and the even-numbered lower electrodes is denoted by ④.

FIG. 6 illustrates a table showing kinds of driving signals applied to respective electrodes in FIG. 5 and formation of light transmitting areas and light blocking areas.

Referring to FIG. 6, in the case where only V2 is applied and V1, V3, and V4 are cut off, only the areas ① and ② become the light transmitting areas, and the areas ③ and ④ become the light blocking areas.

If the control unit 130 applies V3 and cuts off V1, V2, and V4 in this state, only the areas ② and ③ become the light transmitting areas.

If the control unit 130 applies V4 and cuts off V1, V2, and V3, only the areas ③ and ④ become the light transmitting areas, while if the control unit 130 applies only V1, only the areas ① and ④ become the light transmitting areas.

As described above, if the control unit 130 sequentially applies the driving signals to the respective electrode connection units, it becomes possible to directionally move the positions of the light transmitting areas.

Further, since about half of each of the upper electrodes and half of each of the lower electrodes overlap each other, one barrier unit 110 is divided into four areas and a corresponding multi-viewpoint image can be displayed.

Figure 7:
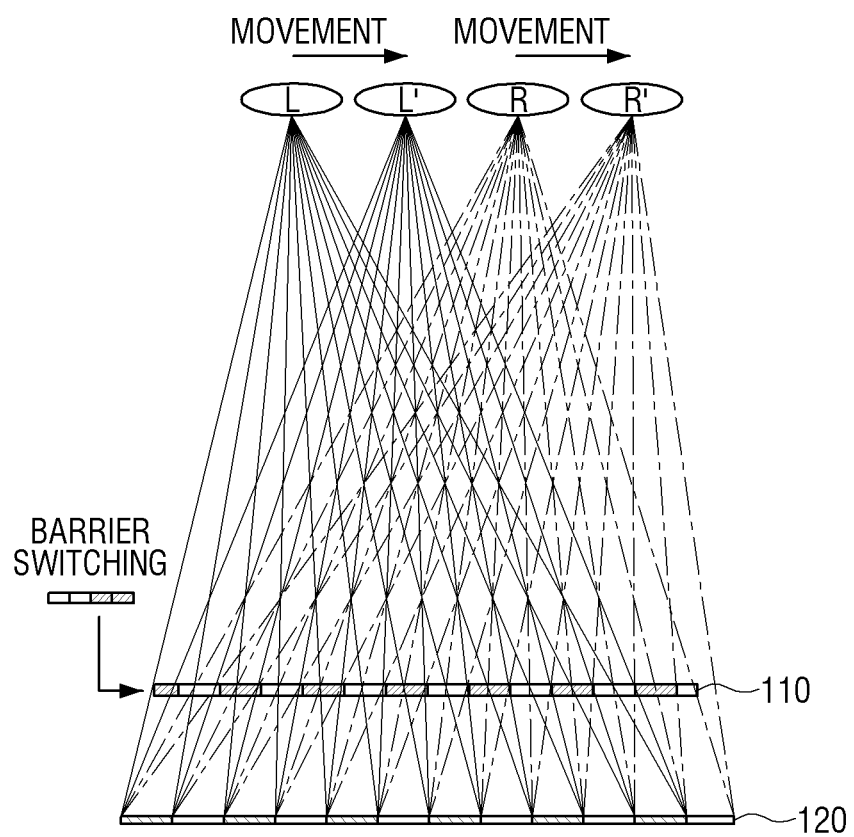
FIG. 7 is a diagram illustrating a process of shifting light transmitting areas using the barrier unit as configured in FIG. 3.

FIG. 7 is a diagram illustrating a method of shifting light transmitting areas in a 3D display apparatus to which the barrier unit structure of FIG. 3 is applied. For convenience in understanding, user's left eye and right eye are defined on the basis of the position of the 3D display apparatus on the contrary to the actual position.

Referring to FIG. 7, it is assumed that the distance between the user's left eye and right eye is 65 mm, and the user's left eye and right eye are moved to the right for about 35 mm on the basis of the original positions (L, R) and are positioned at new positions (L', R').

Referring to FIG. 7, if the user's eyes move to the new positions (L', R'), the driving state of the barrier unit is switched to match the new positions. In the case of FIG. 7, if V3 is applied and V1, V2, and V4 are cut off in a state where only V2 is applied and V1, V3, and V4 are cut off, the light transmitting areas are shifted from the areas ① and ② to the areas ② and ③.

If the driving state of the barrier unit 110 is switched as described above, a first row image of the multi-viewpoint image that is displayed on the display panel unit 120 is recognized at a new left-eye position L', and a second row image is recognized at the new right-eye position R'. Accordingly, even if the user changes his/her position, the left-eye and right-eye images are normally recognized, and thus the user can perceive the 3D effect.

The above-described upper electrodes and lower electrodes may be implemented by ITO (Indium Tin Oxide) transparent electrodes.

Figure 8:
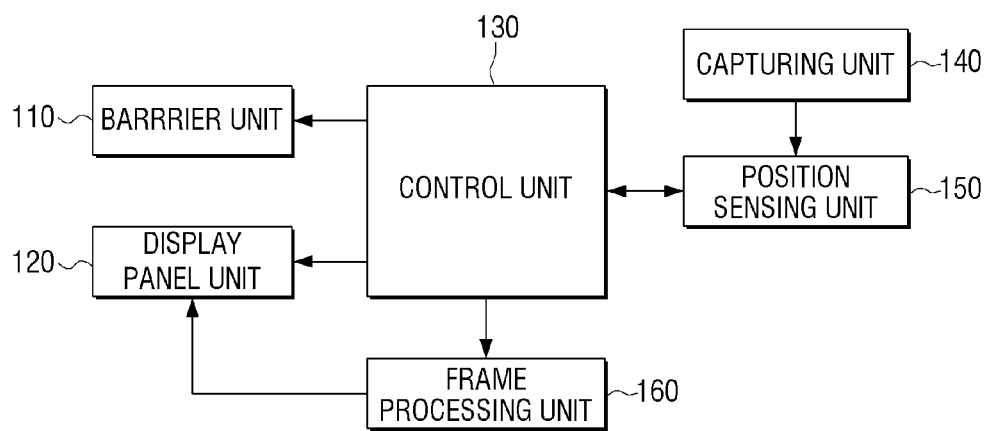
FIG. 8 is a block diagram illustrating the configuration of a 3D display apparatus according to another aspect of an exemplary embodiment.

FIG. 8 is a block diagram illustrating the configuration of a 3D display apparatus according to an aspect of an exemplary embodiment. Referring to FIG. 8, the 3D display apparatus includes a barrier unit 110, a display panel unit 120, a control unit 130, a capturing unit 140 (e.g., a capture device), a position sensing unit 150 (e.g., a position sensor), and a frame processing unit 160 (e.g., a frame processor).

As described above with reference to FIG. 2, the barrier unit 110 and the display panel unit 120 are configured to provide the multi-viewpoint image to the user so that the user can perceive the 3D effect. Duplicate explanation of the configuration as shown in FIG. 2 will be omitted.

The capturing unit 140 captures an image of a user who uses the 3D display apparatus. The capturing unit 140 may be implemented by a camera.

The position sensing unit 150 senses the position of the user using data captured by the capturing unit 140. For example, the position sensing unit 150 divides an image frame captured by the capturing unit 140 into a plurality of blocks. The position sensing unit 150 detects representative values of the respective blocks. The representative values are values that can represent the characteristics of the corresponding block, and various values, such as a pixel average value, a maximum pixel value, a minimum pixel value, and a total pixel value of pixels in the block, may be used as the representative values. The position sensing unit 150 compares the detected representative values, connects continually arranged blocks having similar representative values to one another, and recognizes the connected blocks as one object. Specifically, a user's face portion may be recognized as the object. The position sensing unit 150 searches for matched objects through comparison of the current frame with the previous frame, and detects the movement distance and direction through comparison of the positions of the searched objects. As described above, the position sensing unit 150 can sense the user's position and movement state.

The frame processing unit 160 generates and provides a multi-viewpoint image to the display panel unit 120. If the barrier unit 110 having the structure as shown in FIG. 3 is provided, the frame processing unit 160 can generate a 2-viewpoint image using the left-eye images and the right-eye images. A method of generating a 2-viewpoint image will be described later.

The control unit 130 controls the display panel unit 120 and the barrier unit 110 depending on the result of sensing through the position sensing unit 150 and prevents images having different viewpoints from being incident to the left eye and the right eye. That is, the control unit 130 may control the barrier unit 110 so that the positions of the light transmitting areas are shifted depending on the movement direction of the user.

The barrier unit 110 may be configured as shown in FIGS. 3 and 4. The control unit 130 may shift the light transmitting areas through driving of the barrier unit 110 as shown in FIGS. 5 to 7.

On the other hand, the barrier unit 110 may be implemented differently from that illustrated in FIGS. 3 and 4.

Figure 9:
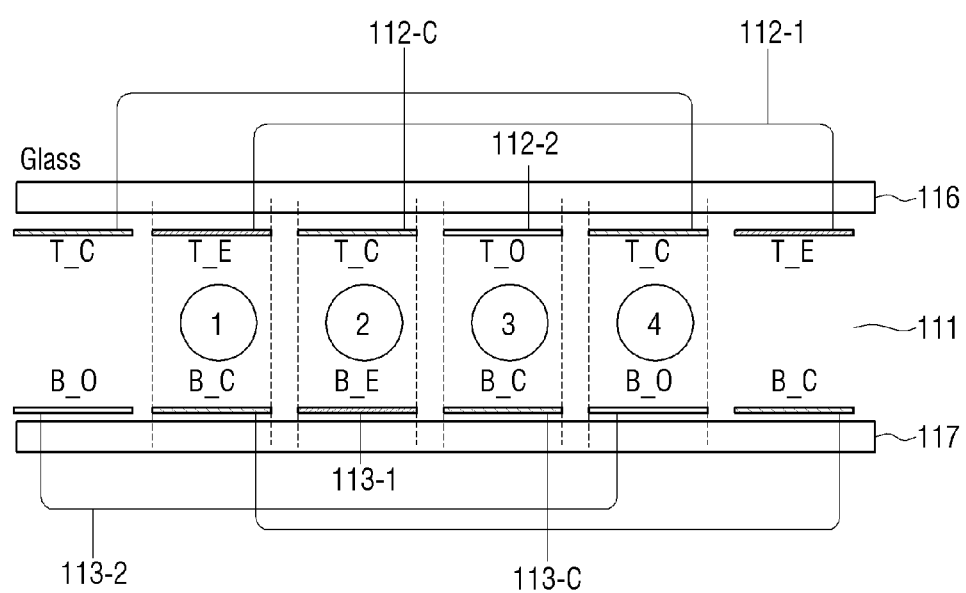
FIG. 9 is a diagram illustrating the configuration of a barrier unit according to another aspect of an exemplary embodiment.

FIG. 9 is a diagram illustrating the configuration of a barrier unit according to another aspect of an exemplary embodiment. Referring to FIG. 9, the barrier unit 110 includes a liquid crystal layer 111, a plurality of upper electrodes 112-1, 112-2, and 112-C provided on one side of the liquid crystal layer, and a plurality of lower electrodes 113-1, 113-2, and 113-C provided on the other side of the liquid crystal layer.

The upper electrodes include upper common electrodes 112-C that are repeatedly arranged. Between the upper common electrodes, the first upper electrode 112-1 and the second upper electrode 112-2 are alternately arranged one by one.

The lower electrodes also include lower common electrodes 113-C, and the first lower electrode 113-1 and the second lower electrode 113-2 alternately arranged between the lower common electrodes.

As illustrated in FIG. 9, the upper common electrodes 112-C and the lower common electrodes 113-C are arranged to cross each other so that they do not overlap each other through the liquid crystal layer 111 interposed between them.

The first upper electrode 112-1 and the second upper electrode 112-2 are arranged at positions opposite to the lower common electrodes 113-C through the liquid crystal layer 111 interposed between the first and second upper electrodes. The first lower electrode 113-1 and the second lower electrode 113-2 are arranged at positions opposite to the upper common electrodes 112-C through the liquid crystal layer 111 interposed between the first and second lower electrodes. Further, on the upper portion and the lower portion thereof, glass substrates 116 and 117 are provided, respectively. In addition, a configuration such as a polarizing plate may be additionally provided, but the illustration and explanation thereof will be omitted.

The control unit 130 may perform supplying the driving signal to one of the first upper electrode 112-1, the second upper electrode 112-2, the first lower electrode 113-1, and the second lower electrode 113-2 and grounding the remaining electrodes, the upper common electrodes and the lower common electrodes to form the light transmitting areas on the liquid crystal layer 111. The control unit 130 can shift the light transmitting areas through repetition of sequential performing of such a driving work.

The control unit 130 can drive the barrier unit 110 as shown in FIG. 10. FIG. 10 is a diagram illustrating a method of driving the barrier unit having the structure shown in FIG. 9. That is, in FIG. 9, it is assumed that a liquid crystal layer area between the first upper electrode 112-1 and the lower common electrode 113-C is denoted by ①, a liquid crystal layer area between the upper common electrode 112-C and the first lower electrode 113-1 is denoted by ②, a liquid crystal layer area between the second upper electrode 112-2 and the lower common electrode 113-C is denoted by ③, and a liquid crystal layer area between the upper common electrode 112-C and the second lower electrode 113-C is denoted by ④.

In this case, if the driving signal is supplied to the first upper electrode 112-1 only and the remaining electrodes are all grounded, the area ① is turned on. Next, if the driving signal is supplied to the first lower electrode 113-1 only and the remaining electrodes are all grounded, the area ② is turned on. In the same manner, if the driving signal is sequentially applied to the second upper electrode and the second lower electrode while the remaining electrodes are grounded, the areas ③ and ④ are sequentially turned on. As a result, the light transmitting area is shifted from the area ① to the area ④.

The control unit 130 drives the barrier unit 110 in the method as illustrated in FIG. 10, and thus enables the user to perform effective 3D viewing regardless of the position and/or movement of the user.

Figure 11:
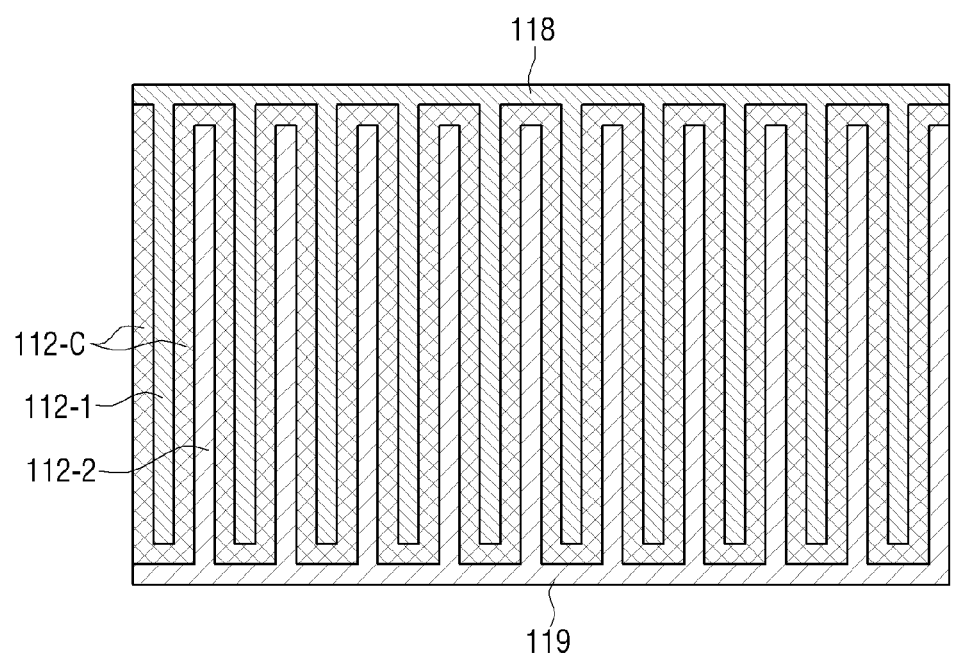
FIG. 11 is a diagram illustrating a planar structure of the barrier unit of FIG. 9.

FIG. 11 is a diagram illustrating an example of a planar structure of the barrier unit 110 of FIG. 9. In FIG. 9, the upper electrodes 112-1, 112-2, and 112-C and the lower electrodes 113-1, 113-2, and 113-C may be electrically separated to be separately driven, or parts of the electrodes may be electrically connected to be driven together.

That is, as illustrated in FIG. 11, on the upper surface of the liquid crystal layer 111, a first upper electrode connection unit 118 in which the first upper electrodes are electrically connected and a second upper electrode connection unit 119 in which the second upper electrodes are electrically connected may be provided. The first and second upper electrode connection units 118 and 119 may be arranged on the opposite side around the respective upper electrodes.

The upper common electrodes may be connected together in the form of a meander between the first upper electrodes and the second upper electrodes to be implemented as one common electrode. The respective electrodes are spaced apart from each other and are electrically separated from each other.

FIG. 11 shows the upper side of the barrier unit 110, but the lower side thereof may be manufactured to have the same structure. That is, on the lower surface of the liquid crystal layer 111, a first lower electrode connection unit (not illustrated) in which the first lower electrodes are electrically connected and a second lower electrode connection unit in which the second lower electrodes are electrically connected may be provided. The lower common electrodes may be connected together in the form of a meander between first and second lower electrodes.

In the case where the barrier unit 110 having the structure as shown in FIG. 9 is provided, the frame processing unit 160 may generate a 4-viewpoint image. The frame processing unit 160 can generate a 4-viewpoint image frame in which four images captured at different time points are alternately arranged in a vertical row direction.

The display panel unit 120 displays the 4-viewpoint image frame generated by the frame processing unit 160 at a speed that is four times higher than the speed of a typical image frame.

The control unit 130 sequentially shifts the light transmitting areas through driving of the barrier unit 110 in a state where the display panel unit 120 is driven at high speed, and thus the resolution can be maintained.

Figure 12:
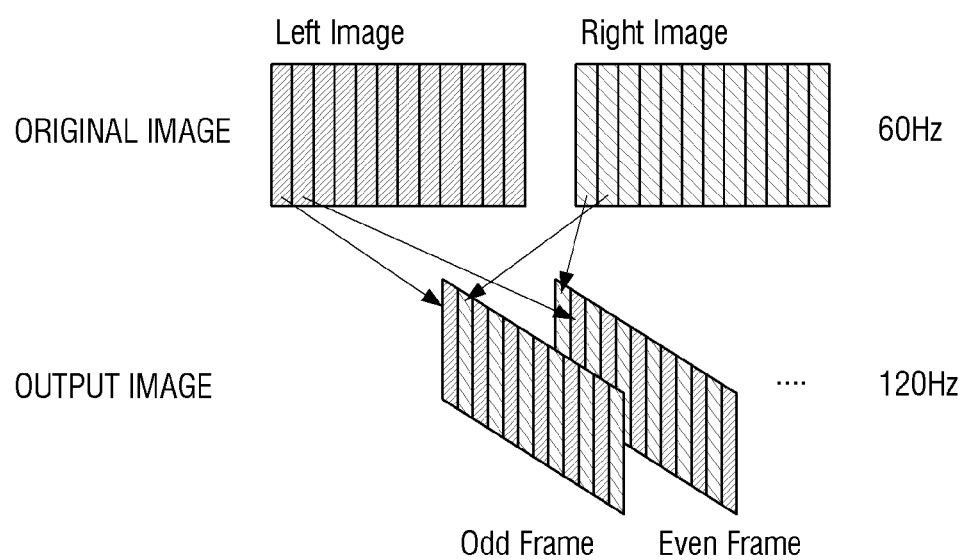
FIGS. 12 and 13 are diagrams illustrating a method of forming an output image using an original image.

FIG. 12 is a diagram illustrating an example of a method of generating a multi-viewpoint image. Referring to FIG. 12, the frame processing unit 160 receives left-eye images and right-eye images included in the original image. The frame processing unit 160 divides the left-eye images and the right-eye images into a plurality of vertical rows, and forms an odd frame through combination of the odd lines of the left-eye images and the odd lines of the right-eye images and an even frame through combination of the even lines of the left-eye images and the even lines of the right-eye images. Hereinafter, the odd frame is called a first frame, and the even frame is called a second frame. The first frame and the second frame become an output image.

Since the 3D display apparatus in the related art generates one multi-viewpoint frame through combination of left-eye images and right-eye images, it is unable to display the whole vertical rows in one frame. Accordingly, only the vertical rows that correspond to a half of the left-eye images and a half of the right-eye images are combined, and thus the resolution is reduced by half. However, if 2-viewpoint frames are generated and displayed, the resolution is maintained.

As shown in FIG. 12, if the left-eye images and the right-eye images are displayed at a frequency of 60 Hz, the display panel unit 120 displays the first frame and the second frame at a frequency of 120 Hz. Accordingly, the resolution is maintained.

Figure 13:
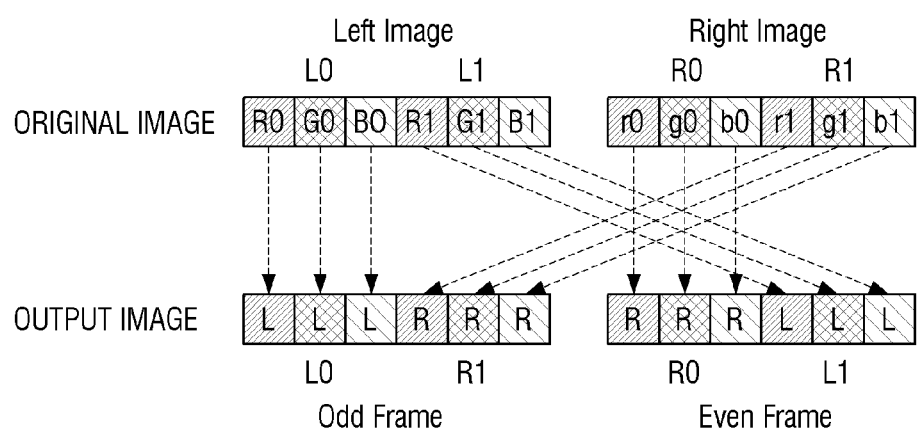

FIG. 13 shows a pixel structure when the output image is configured in the method as shown in FIG. 12. Referring to FIG. 13, the first pixel L0 of the left-eye images of the original image is composed of three sub-pixels R0, G0, and B0. The second pixel L1 is composed of sub-pixels R1, G1, and B1. The first pixel R0 of the right-eye image is composed of sub-pixels r0, g0, and b0, and the second pixel R1 is composed of sub-pixels r1, g1, and b1. Accordingly, the left-eye images and the right-eye images are interlaced in the unit of a pixel. As a result, as shown in FIG. 13, as the first pixel of the first frame that is the output image, the first pixel of the left-eye image is arranged as it is, and as the second pixel of the first frame, the second pixel of the right-eye image is arranged. By contrast, the first pixel of the right-eye image is arranged as the first pixel of the second frame, and the second pixel of the left-eye image is arranged as the second pixel of the second frame.

In the case where the light transmitting area is configured at an interval of one pixel, r1, g1, b1, r3, g3, and b3 of the first frame come into the user's right eye, and r0, g0, b0, r2, g2, and b2 of the second frame come into the user's right eye. Further, R0, G0, B0, R2, G2, and B2 of the first frame come into the user's left eye, and R1, G1, B1, R3, G3, and B3 of the second frame come into the user's left eye. As described above, since the user can see both the first frame and the second frame, the resolution is not lost.

The frame processing unit 160 may form the first frame and the second frame through combination of sub-pixels of the respective pixels of the left-eye images and the right-eye images in various methods. As an example that is different from the example shown in FIG. 13, the frame processing unit 160 may form the first frame in the form of R0, g1, B0, r1, G0, and b1, and may form the second frame in the form of r0, G1, b0, R1, g0, and B1.

Further, the frame processing unit 160 may form the first frame in the form of R0, g0, B0, r1, G1, and b1, and may form the second frame in the form of r0, G0, b0, R1, g1, and B1.

Figure 14:
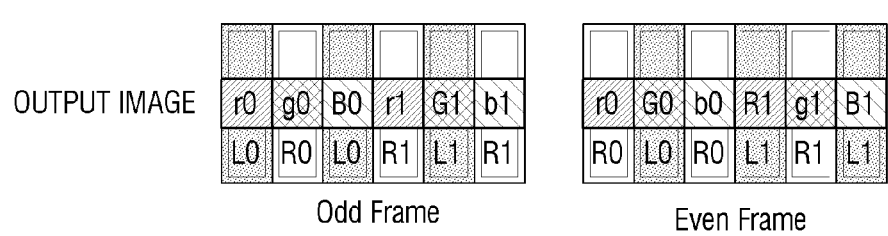

FIGS. 14 to 16 are diagrams illustrating a frame structure configured according to various aspects of exemplary embodiments.

Referring to FIG. 14, the frame processing unit 160 forms the first frame through combination of some sub-pixels of the first pixel L0 and the second pixel L1 of the left-eye image and some sub-pixels of the first pixel R0 and the second pixel R1 of the right-eye image, such as R0, g0, B0, r1, G1, and b1. Further, the frame processing unit 160 forms the second frame through combination of the remaining sub-pixels of the first pixel L0 and the second pixel L1 of the left-eye image and the remaining sub-pixels of the first pixel R0 and the second pixel R1 of the right-eye image, such as r0, G0, b0, R1, g1, and B1.

Referring to FIG. 15, the frame processing unit 160 forms the first frame through combination of sub-pixels of the first pixel L0 of the left-eye image and sub-pixels of the second pixel R1 of the right-eye image, such as R0, g1, B0, r1, G0, and b1. Further, the frame processing unit 160 forms the second frame through combination of sub-pixels of the first pixel R0 of the right-eye image and sub-pixels of the second pixel L1 of the left-eye image, such as r0, G1, b0, R1, g0, and B1.

Referring to FIG. 16, the frame processing unit 160 forms the first frame through combination of some sub-pixels of the first pixel L0 and the second pixel L1 of the left-eye image and some sub-pixels of the first pixel R0 and the second pixel R1 of the right-eye image, such as R0, g0, B0, r1, G1, and b1. Further, the frame processing unit 160 forms the second frame through combination of the remaining sub-pixels of the first pixel L0 and the second pixel L1 of the left-eye image and the remaining sub-pixels of the first pixel R0 and the second pixel R1 of the right-eye image, such as r0, G0, b0, R1, g1, and B1.

As described above, the frame processing unit 160 may for the first and second frames through combination of plural sub-pixels that constitute the pixels of the left-eye image and plural sub-pixels that constitute the pixels of the right-eye image. Specifically, the frame processing unit 160 may form the first frame and the second frame through distribution of RGB sub-pixels that constitute the pixels of the left-eye images and rgb sub-pixels that constitute the pixels of the right-eye images to the first frame and the second frame, respectively, to be combined as new pixels.

The combination method that is performed by the frame processing unit 160 may be determined through experiments for obtaining the optimum image quality.

As described above, in the case where the barrier unit 110 is configured as shown in FIG. 3 or FIG. 9, the control unit 130 operates to shift the light transmitting areas in association with the display state of the display panel unit 120.

However, in the case where the barrier unit 110 is configured differently from that as shown in FIG. 3 or FIG. 9, the left-eye image may be input to the right eye of the user and the right-eye image may be input to the left eye of the user when the user moves.

That is, in order to prevent the deterioration of the resolution, the control unit 130 divides the barrier unit 110 into odd lines and even lines, makes the odd lines and the even lines be alternately turned on/off, and controls the display panel unit 120 to alternately output the odd frame and the even frame in association with this.

At this time, if the inter-ocular distance is set to about 65 mm and the size of the upper and lower electrodes of the barrier unit is determined accordingly, the left and right images are changed whenever the user moves as much as the inter-ocular distance, and thus the user can view an inverse image periodically. A position in which the inverse image is viewed may be called an inverse visual field, and a position in which the left and right images are clearly separated, and the left eye can see the left-eye image and the right eye can see the right-eye image may be called a normal visual field.

The control unit 130 inverts the positions of the light transmitting areas and the light blocking areas of the barrier unit 110 depending on the user's position and/or movement so that the user can constantly view a normal image.

That is, in the case where the capturing unit 140 of the configuration as shown in FIG. 8 captures an image of the user and the position sensing unit 150 senses the user's position and/or movement, the control unit 130 inverts the positions of the light transmitting areas and the light blocking areas of the barrier unit 110 at a time point where a user moves from a normal visual field to an inverse visual field. The control unit 130 can invert the positions of the light transmitting areas and the light blocking areas through inversion of the polarity of the driving signal applied to the upper and lower electrodes of the barrier unit 110.

Figure 17:
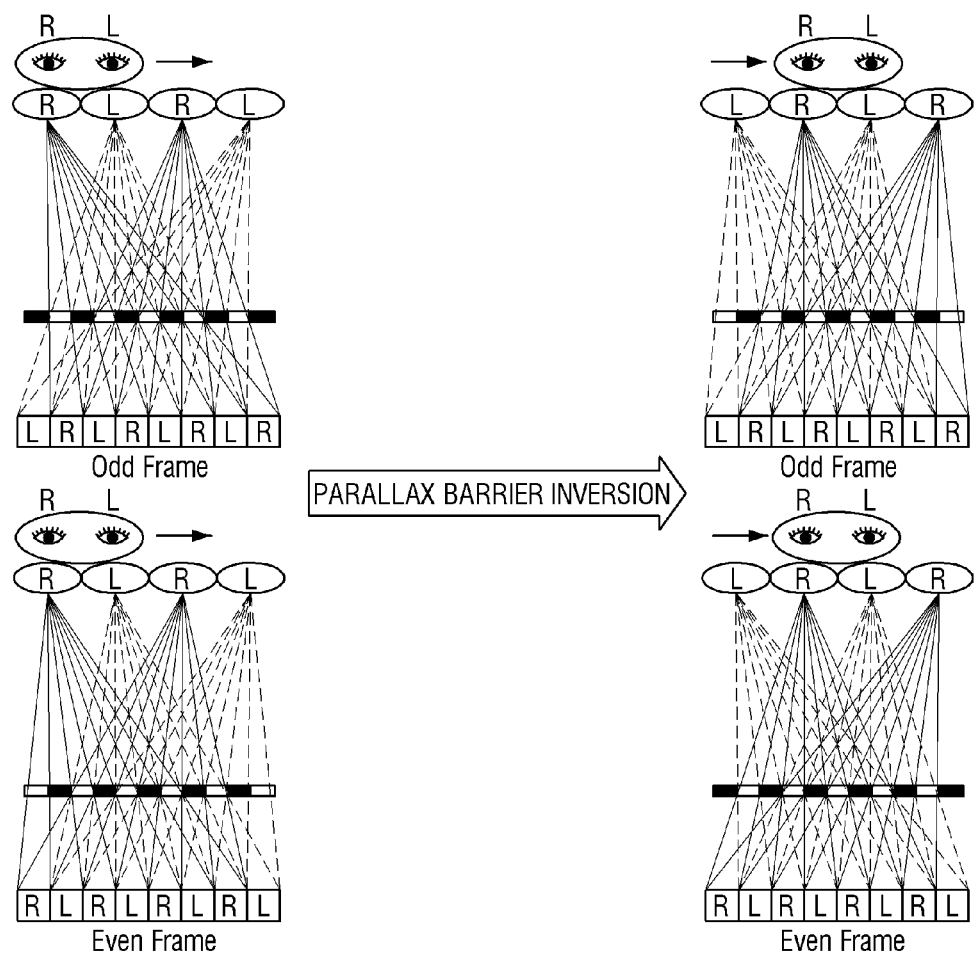
FIG. 17 is a diagram illustrating a process of inverting a driving state of a barrier unit in a 3D display apparatus according to another an aspect of an exemplary embodiment.

FIG. 17 is a diagram illustrating a process of inverting the positions of the light transmitting areas and the light blocking areas.

Referring to FIG. 17, in the odd frame in which the left-eye images and the right-eye images are alternately arranged, the control unit 130 turns off the odd lines of the barrier unit 110 and turns on the even lines of the barrier unit 110. If a user moves in this state, the control unit 130 turns on the odd lines and turns off the even lines.

In the same manner, in the even frame in which the right-eye images and the left-eye images are alternately arranged, the control unit 130 turns on the odd lines of the barrier unit 110 and turns off the even lines of the barrier unit 110. If a user moves in this state, the control unit 130 turns off the odd lines and turns on the even lines.

Figure 18:
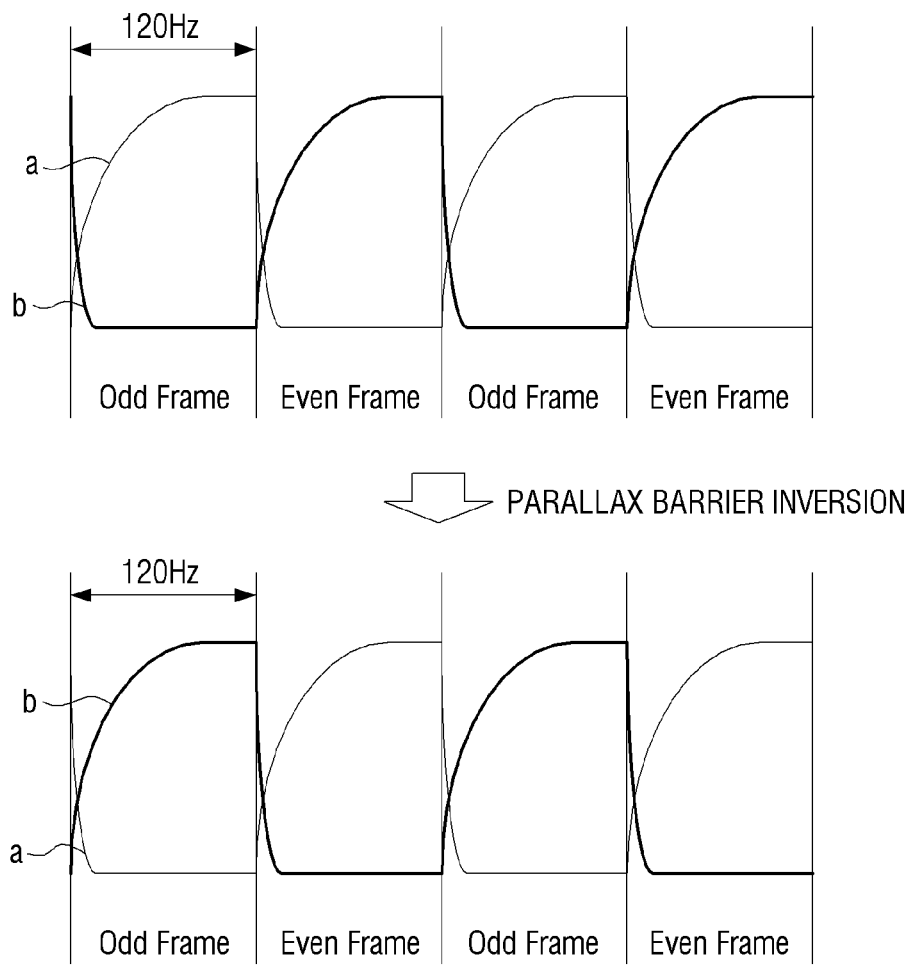
FIG. 18 is a diagram illustrating a liquid crystal response state according to the inversion of a barrier unit.

Accordingly, even if the user moves, the left-eye images L remain incident to the left eye of the user as they are, and the right-eye images R remain incident to the right eye of the user. FIG. 18 shows a liquid crystal response state according to an inverted driving signal.

In FIG. 18, the liquid crystal corresponding to the odd line of the barrier unit 110 is turned on in the odd frame as shown as a waveform (a), and the liquid crystal corresponding to the even line is turned on in the even frame as shown as a waveform (b). If a barrier inversion driving is performed in this state, only the liquid crystal of the even line is turned on in the odd frame, and only the liquid crystal of the odd line is turned on in the even frame. As a result, even if a user moves, the user can constantly view a normal image.

On the other hand, if the inversion driving of the barrier unit is performed as shown in FIG. 18, an instantaneous image flickering phenomenon may occur during the inversion driving. In order to prevent this phenomenon, the control unit 130 may delay the application timing of the driving signal provided to the barrier unit 110 during the inversion driving to achieve smooth inversion.

Figure 19:
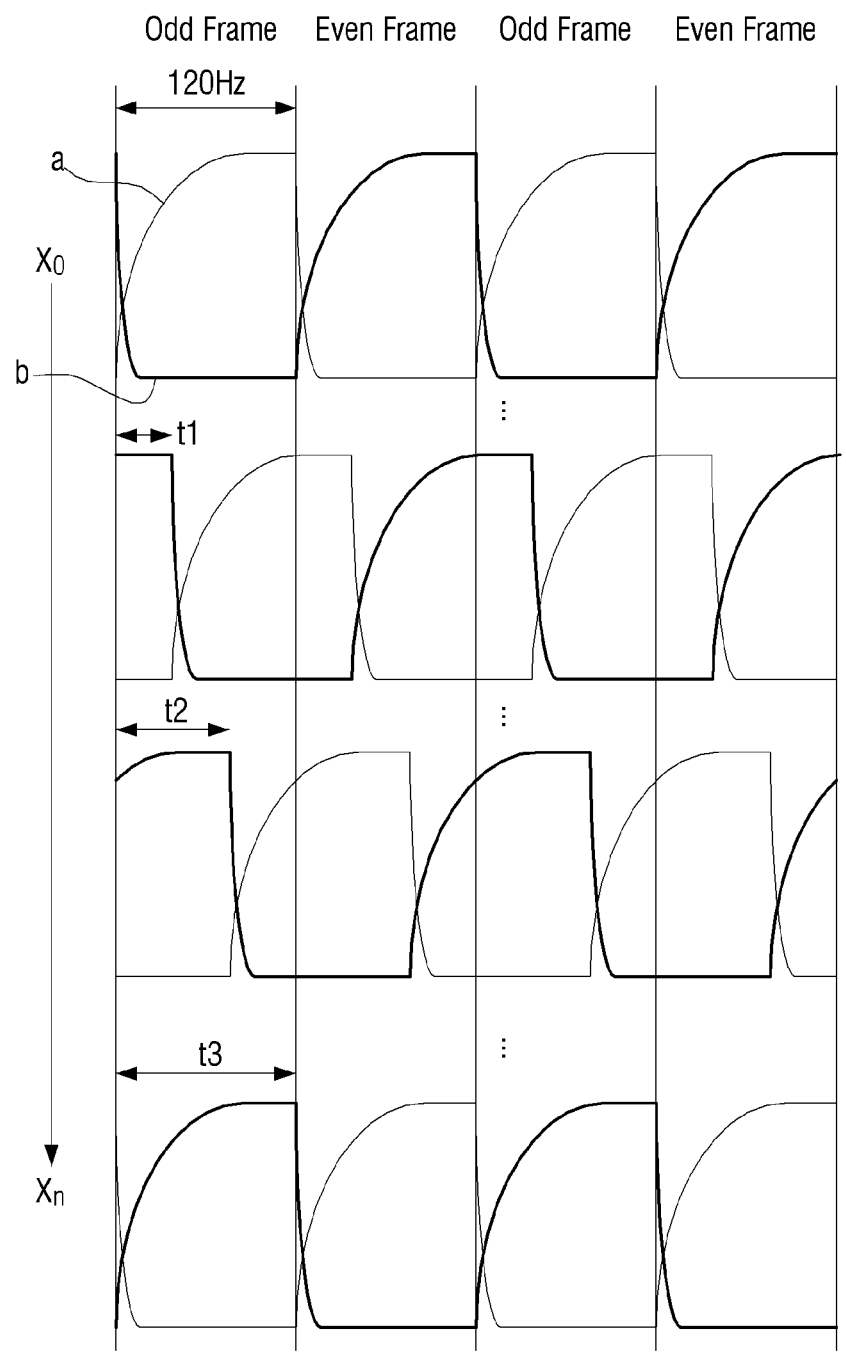
FIG. 19 is a diagram illustrating a liquid crystal response state when the driving of a barrier unit is delayed.

FIG. 19 shows a liquid crystal response state according to an exemplary embodiment in which the application timing of the driving signal is delayed.

If the user moves from position X0 to position Xn, the control unit 130 controls the barrier unit 110 to invert the driving state. The inversion of the driving state corresponds to the shifting of the driving signal for a half period. Accordingly, if the viewing position is moved from the normal visual field to the inverse visual field and the driving delay of the barrier unit 110 is continuously changed from 0 to a half period to match the movement of the viewing position, the inversion can be performed without the image flickering phenomenon. As shown in FIG. 19, when the driving delay is gradually increased from 0 to t3 through t1 and t2, the size of the driving delay becomes a half period to achieve the inversion. The control unit 130 can adjust the delay change speed of the input timing of the driving signal to match the user's moving speed.

On the other hand, in the case of changing the driving delay of the barrier unit 110 depending on the user's viewing position, the inverse visual field can be eliminated without the occurrence of flickering, but the liquid crystal response speed of the barrier unit 110 becomes lowered to cause the occurrence of a luminance difference due to the delay. Accordingly, the control unit 130 can reduce the luminance difference through increasing the opening rate of the barrier unit 110.

Figure 20:
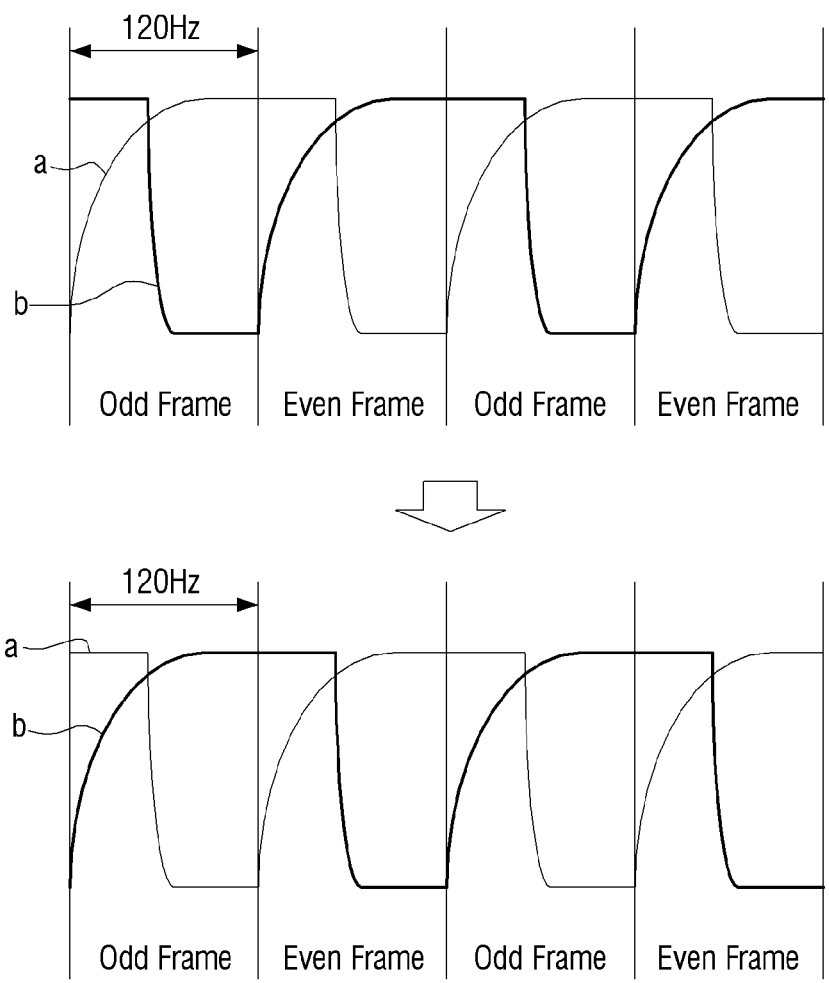
FIG. 20 is a diagram illustrating a liquid crystal response state of a barrier unit having an increased light transmittance.

FIG. 20 is a diagram illustrating the liquid crystal response state of the barrier unit according to an exemplary embodiment that can reduce the luminance difference.

As shown in FIG. 20, the driving state (a) of the odd lines and the driving state (b) of the even lines of the barrier unit 110 are inverted depending on the user's position and/or movement. Referring to FIG. 20, before the inversion, the peak area of (a) is larger than the peak area of (b), while after the inversion, the peak area of (b) becomes larger than the peak area of (a). The control unit 130 drives the barrier unit 110 so that the size of the liquid crystal in an on state becomes larger than the size of the liquid crystal in an off state as shown in FIG. 20.

According to another aspect of an exemplary embodiment, the control unit 130 may perform the inversion for inverting the polarity of the voltage that is applied to the respective electrodes of the display panel unit 120.

That is, in the liquid crystal barrier type 3D display apparatus, the light transmitting areas and the light blocking areas are formed through supplying of the driving signals to the upper electrodes and the lower electrodes provided in the barrier unit 110, and the electrodes provided in the display panel unit 120 are driven through applying of the voltage thereto. In this case, if the driving signals having the same polarity are continuously applied to the same electrodes, the characteristics of the electrodes may be changed due to the offset value. In order to prevent this, the control unit 130 may invert the polarity of the driving voltage periodically or non-periodically. That is, the method of driving the electrodes through providing of the (+) driving signal and the ground signal may be switched over to the method of driving the electrodes through providing of the (−) driving signal and the ground signal.

Examples of the inversion methods may include frame inversion driving, vertical line inversion driving, horizontal line inversion driving, and dot inversion driving.

Figure 21:
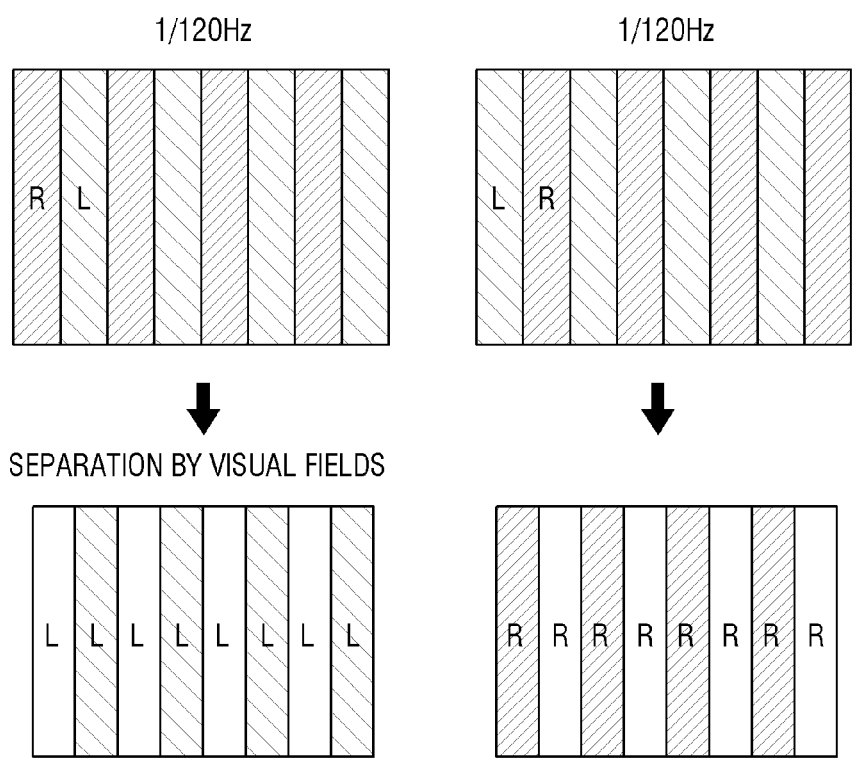

FIG. 21 shows the screen state according to the frame inversion driving method. As illustrated in FIG. 21, according to the frame inversion driving method, the (+) polarity is applied to the whole display panel unit 120 when the first frame is displayed, and the (−) polarity is applied when the second frame is displayed.

In the case of performing the inversion according to the frame inversion driving method, vertical discontinuous lines are formed in the left-eye images and the right-eye images through separation by visual fields. Accordingly, the user can recognize artifacts in the vertical direction.

Figure 22:
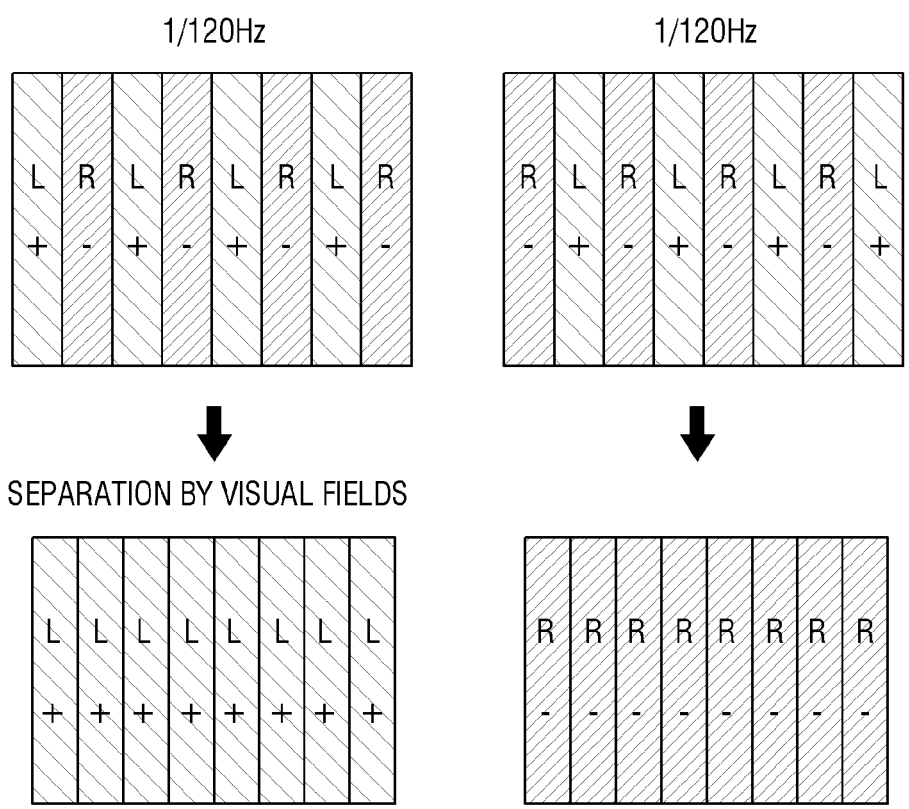

FIG. 22 shows the screen state according to the vertical line inversion driving method. According to the vertical line inversion driving method, the display panel unit 120 is grouped by plural vertical lines, and voltages having different polarities are applied thereto.

In the case of performing the vertical line inversion as shown in FIG. 22, the luminance of the left-eye images becomes higher than the luminance of the right-eye images and the luminance difference occurs through separation by visual fields. However, through experiments, the user scarcely recognizes the luminance difference between an image seen through the left eye and an image seen through the right eye. Accordingly, in the case of performing the vertical line inversion, the user can recognize clear images without the artifacts.

FIG. 23 shows the screen state according to the horizontal line inversion driving method. According to the horizontal line inversion driving method, plural horizontal lines are tied, and voltages having different polarities are applied thereto. In the case of applying the horizontal line inversion driving method, a check pattern in which high-luminance portions and low-luminance portions of the left-eye images and the right-eye images cross each other in the unit of a pixel through separation by visual fields.

FIG. 24 shows the screen state according to the dot inversion driving method. According to the dot inversion driving method, one screen is grouped into plural dot shapes, and voltages having different polarities are applied thereto. In the case of applying the dot inversion driving method, horizontal line artifacts are formed in the left-eye images and the right-eye images through separation by visual fields.

Accordingly, from the viewpoint of artifact elimination, it is advantageous that the control unit 130 uses the vertical line inversion driving method or the horizontal line inversion driving method.

In the above-described exemplary embodiments, for convenience, the inversion driving of the display panel unit 120 and the barrier pattern unit of the barrier unit 110 are in the unit of a pixel. However, the unit for the inversion is not limited thereto, and the inversion may be performed in various units, such as in the unit of a sub-pixel, in the unit of plural sub-pixels, and in the unit of plural pixels.

According to another exemplary embodiment, the control unit 130 may perform the inversion operation in at least one frame unit period. In the case of the above-described frame inversion driving method or the dot inversion driving method, artifacts are formed to deteriorate the 3D image quality. However, by performing the inversion in the unit of plural frames, another aspect may be taken.

For example, in the case of performing the vertical line inversion every two frames, the luminance of the first left-eye image is higher than the luminance of the right-eye image. However, after the inversion, the luminance of the right-eye images becomes higher than the luminance of the left-eye images. Accordingly, the luminance difference can be prevented from being fixed.

Further, in the case of performing the dot inversion in the unit of two frames, the positions of the pixels driven by the (+) driving voltage and the pixels driven by the (−) driving voltage periodically cross each other, and thus the visibility can be improved.

The optimum inversion method to suit the product can be selected in collective consideration of the power consumption, panel characteristics, and the like.

That is, the control unit 130 can perform the inversion according to one of the above-described frame inversion, vertical line inversion, horizontal line inversion, and dot line inversion in the unit of at least one frame. Accordingly, fatigue can be reduced when viewing 3D images, and better 3D image quality can be provided.

As described above, the 3D display apparatus according to various aspects of exemplary embodiments may be configured and driven in various structures.

Figure 25:
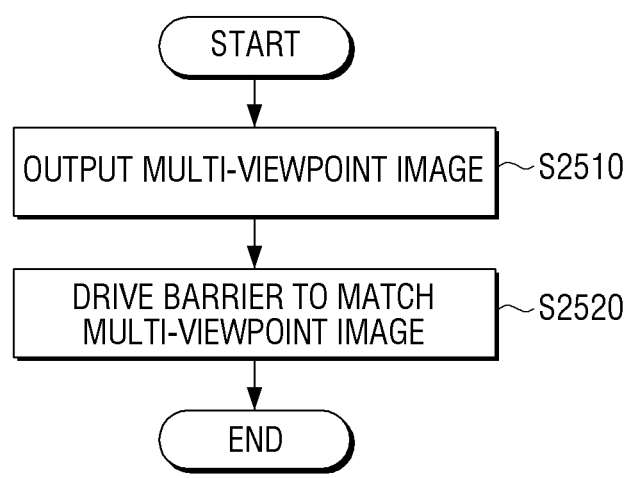
FIG. 25 is a flowchart illustrating a method of driving a 3D display apparatus according to another aspect of an exemplary embodiment.

FIG. 25 is a flowchart illustrating a method of driving a 3D display apparatus according to an aspect of an exemplary embodiment.

Referring to FIG. 25, a multi-viewpoint image is output (S2510) and a barrier unit is driven to match the output of the multi-viewpoint image (S2520).

The barrier unit may include a liquid crystal layer arranged on one side of a display panel unit, a plurality of upper electrodes continually arranged to be spaced apart from one another on an upper surface of the liquid crystal layer, and a plurality of lower electrodes continually arranged to be spaced apart from one another on a lower surface of the liquid crystal layer.

A driving signal is applied to the upper and lower electrodes of the barrier unit. The liquid crystal that is adjacent to the electrodes to which the driving signal is applied is turned on to form light transmitting areas, and other liquid crystal portions are turned off to form light blocking areas. The light transmitting areas and the light blocking areas are alternately arranged.

Specifically, the barrier unit may be provided with various structures as shown in FIG. 3 or FIG. 9. Accordingly, duplicate explanation of the structure of the barrier unit and the driving method thereof will be omitted.

According to another aspect of an exemplary embodiment, the driving method may further include capturing an image of a user, and sensing the position of the user by using captured data. Accordingly, if the position of the user changes, the plurality of upper electrodes and the plurality of lower electrodes are sequentially driven so that positions of the light transmitting areas are shifted depending on the direction of the movement. Since this operation has been described in detail, further explanation and illustration thereof will be omitted.

Here, the multi-viewpoint image may be a frame in which left-eye images and right-eye images are combined or a frame in which three or more images are combined.

The driving method according to an aspect of an exemplary embodiment, in which the left-eye images and the right-eye images are combined to form two frames, may further include generating a first frame in which the left-eye images and the right-eye images are alternately arranged in a first order in a vertical row direction and a second frame in which the left-eye images and the right-eye images are alternately arranged in a second order in the vertical row direction. Here, the first order means a pattern in which the left-eye images and the right-eye images are alternately arranged, and the second order means a pattern in which the right-eye images and the left-eye images are alternately arranged.

On the other hand, the driving method according to an aspect of an exemplary embodiment may further include, if the user's position and/or movement is sensed, inverting the positions of the light transmitting areas and the light blocking areas of the barrier unit at a time point where a user moves from a normal visual field to an inverse visual field.

The driving method according to an aspect of an exemplary embodiment may further include, if the user's position and/or movement is sensed, shifting a driving period of the barrier unit for a half period by gradually delaying input timing of the driving signals to be applied to the electrodes depending on the moving speed of the user.

In addition, the driving method according to an aspect of an exemplary embodiment may further include increasing a size of the light transmitting area.

The multi-viewpoint image may be generated through distribution and combination in the unit of sub-pixels that constitute pixels.

The driving method according to an aspect of an exemplary embodiment may further include performing vertical line inversion or performing various kinds of inversions in plural-frame unit period.

Since various exemplary embodiments have been described in detail, the illustration and duplicate explanation thereof will be omitted.

As described above, according to various exemplary embodiments, the resolution of 3D content can be maintained, and the deterioration of image quality can be prevented. Further, even if the user's position is moved, the user can normally perceive the 3D effect. Consequently, the user can effectively view the 3D content.

A program for performing the method according to the various exemplary embodiments may be stored in various types of recording media to be used. In addition, circuitry and/or a processor for performing the method according to the various exemplary embodiments may be used.

Specifically, codes for performing the above-described methods may be stored in various types of computer-readable recording media, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, a memory card, a USB memory, and a CD-ROM.

While exemplary embodiments have been shown and described with reference to the drawings, it will be understood by those skilled in the art that various changes in form and detail may be made therein without departing from the spirit and scope of the inventive concept, as defined by the appended claims.

The invention claimed is:

1. A 3D display apparatus comprising:
   a display panel which displays a multi-viewpoint image;
   a barrier arranged on one side of the display panel; and
   a controller which controls the barrier to alternately form light transmitting areas and light blocking areas,
   wherein the barrier comprises:
   a liquid crystal layer;
   a plurality of upper electrodes, which are linearly arranged on an upper surface of the liquid crystal layer and which are horizontally spaced apart from one another; and
   a plurality of lower electrodes, which are linearly arranged on a lower surface of the liquid crystal layer and which are horizontally spaced apart from one another.

2. The 3D display apparatus as claimed in claim 1, further comprising:
   a capturing device which captures an image of a user; and
   a position sensor which senses a position of the user by using data from the image captured by the capturing device,
   wherein, if the position of the user that is sensed by the position sensor changes and a movement of the user is detected, the controller sequentially drives the plurality of upper electrodes and the plurality of lower electrodes so that positions of the light transmitting areas are shifted corresponding to a direction of the movement.

3. The 3D display apparatus as claimed in claim 2, wherein the plurality of upper electrodes and the plurality of lower electrodes are arranged so that predetermined areas of the upper electrodes and the lower electrodes overlap each other through the liquid crystal layer interposed between the upper electrodes and the lower electrodes.

4. The 3D display apparatus as claimed in claim 3, wherein the barrier further comprises:
   a first upper electrode connector formed on one side of the plurality of upper electrodes to electrically connect odd-numbered upper electrodes of the plurality of upper electrodes;
   a second upper electrode connector formed on the other side of the plurality of upper electrodes to electrically connect even-numbered upper electrodes of the plurality of upper electrodes;
   a first lower electrode connector formed on one side of the plurality of lower electrodes to electrically connect odd-numbered lower electrodes of the plurality of lower electrodes; and
   a second lower electrode connector formed on the other side of the plurality of lower electrodes to electrically connect even-numbered lower electrodes of the plurality of lower electrodes,
   wherein the controller sequentially performs supplying a driving signal to one of the first upper electrode connector, the second upper electrode connector, the first lower electrode connector, and the second lower electrode connector and grounding the remaining electrode connectors.

5. The 3D display apparatus as claimed in claim 1, wherein the multi-viewpoint image comprises a first frame in which left-eye images and right-eye images are alternately arranged in a first order in a vertical row direction and a second frame in which the left-eye images and the right-eye images are alternately arranged in a second order in the vertical row direction,
   wherein the display panel sequentially displays the first frame and the second frame, and the controller switches the light transmitting area and the light blocking area in association with display timing of the first frame and the second frame.

6. The 3D display apparatus as claimed in claim 5, further comprising a frame processor which forms the first frame and the second frame by combining a plurality of sub-pixels that constitute pixels of the left-eye images and a plurality of sub-pixels that constitute pixels of the right-eye images.

7. The 3D display apparatus as claimed in claim 6, wherein the frame processor forms the first frame and the second frame through distribution of RGB sub-pixels that constitute the pixels of the left-eye images and rgb sub-pixels that constitute the pixels of the right-eye images to the first frame and the second frame, respectively, to be combined as new pixels.

8. The 3D display apparatus as claimed in claim 5, further comprising:
a capturing device which captures the image of the user; and
a position sensor which senses the position of the user by using data from the image captured by the capturing device,
wherein, if a movement of the user is sensed by the position sensor, the controller inverts the positions of the light transmitting areas and the light blocking areas of the barrier at a time point where a user moves from a normal visual field to an inverse visual field.

9. The 3D display apparatus as claimed in claim 8, wherein, if the movement of the user is sensed by the position sensor, the controller shifts a driving period of the barrier for a half period by gradually delaying input timing of the driving signals to be applied to the electrodes to be driven from among the plurality of upper electrodes and the plurality of lower electrodes depending on a moving speed of the user.

10. The 3D display apparatus as claimed in claim 9, wherein the controller increases a size of the light transmitting area.

11. A 3D display apparatus comprising:
a display panel which displays a multi-viewpoint image;
a barrier arranged on one side of the display panel; and
a controller which controls the barrier to alternately form light transmitting areas and light blocking areas,
wherein the barrier comprises:
a liquid crystal layer;
a plurality of upper electrodes arranged to be spaced apart from one another on an upper surface of the liquid crystal layer; and
a plurality of lower electrodes arranged to be spaced apart from one another on a lower surface of the liquid crystal layer,
wherein the multi-viewpoint image comprises a first frame in which left-eye images and right-eye images are alternately arranged in a first order in a vertical row direction and a second frame in which the left-eye images and the right-eye images are alternately arranged in a second order in the vertical row direction,
wherein the display panel sequentially displays the first frame and the second frame,
wherein the controller switches the light transmitting area and the light blocking area in association with timing of the first frame and the second frame, and
wherein the controller performs vertical line inversion to perform grouping of the display panel by vertical lines and to apply driving signals having different polarities to respective groups.

12. A 3D display apparatus comprising:
a display panel which displays a multi-viewpoint image;
a barrier arranged on one side of the display panel; and
a controller which controls the barrier to alternately form light transmitting areas and light blocking areas,
wherein the barrier comprises:
a liquid crystal layer;
a plurality of upper electrodes arranged to be spaced apart from one another on an upper surface of the liquid crystal layer; and
a plurality of lower electrodes arranged to be spaced apart from one another on a lower surface of the liquid crystal layer,
wherein the multi-viewpoint image comprises a first frame in which left-eye images and right-eye images are alternately arranged in a first order in a vertical row direction and a second frame in which the left-eye images and the right-eye images are alternately arranged in a second order in the vertical row direction,
wherein the display panel sequentially displays the first frame and the second frame,
wherein the controller switches the light transmitting area and the light blocking area in association with display timing of the first frame and the second frame, and
wherein the controller performs one inversion of a frame inversion, a vertical line inversion, a horizontal line inversion, and a dot inversion in at least one frame period.

13. A method of driving a 3D display apparatus comprising:
outputting a multi-viewpoint image through a display panel; and
applying a driving signal to at least one of a plurality of upper electrodes and a plurality of lower electrodes so that light transmitting areas and light blocking areas are alternately formed in a barrier which includes a liquid crystal layer, the plurality of upper electrodes linearly arranged on an upper surface of the liquid crystal layer and horizontally spaced apart from one another, and the plurality of lower electrodes linearly arranged on a lower surface of the liquid crystal layer and horizontally spaced apart from one another.

14. The method of driving a 3D display apparatus as claimed in claim 13, further comprising generating a first frame in which left-eye images and right-eye images are alternately arranged in a first order in a vertical row direction and a second frame in which the left-eye images and the right-eye images are alternately arranged in a second order in the vertical row direction,
wherein the output step sequentially displays the first frame and the second frame, and
the driving step switches the light transmitting area and the light blocking area in association with display timing of the first frame and the second frame.

15. The method of driving a 3D display apparatus as claimed in claim 14, further comprising:
capturing the image of the user;
sensing the position of the user by using captured data; and
if a movement of the user is sensed, inverting the positions of the light transmitting areas and the light blocking areas of the barrier at a time point where a user moves from a normal visual field to an inverse visual field.

16. The method of driving a 3D display apparatus as claimed in claim 15, further comprising, if the movement of the user is sensed, shifting a driving period of the barrier for a half period by gradually delaying input timing of the driving signals to be applied to the electrodes to be driven from among the plurality of upper electrodes and the plurality of lower electrodes depending on a moving speed of the user.

17. The method of driving a 3D display apparatus as claimed in claim 16, further comprising increasing a size of the light transmitting area.

18. The method of driving a 3D display apparatus as claimed in claim 14, wherein the generating the multi-viewpoint image forms the first frame and the second frame by combining a plurality of sub-pixels that constitute pixels of the left-eye images and a plurality of sub-pixels that constitute pixels of the right-eye images.

19. The method of driving a 3D display apparatus as claimed in claim 18, wherein the generating the multi-viewpoint image forms the first frame and the second frame through distribution of RGB sub-pixels that constitute the pixels of the left-eye images and rgb sub-pixels that constitute the pixels of the right-eye images to the first frame and the second frame, respectively, to be combined as new pixels.

20. The method of driving a 3D display apparatus as claimed in claim 14, further comprising performing vertical line inversion to perform grouping of the display panel by vertical lines and to apply driving signals having different polarities to respective groups.

21. The method of driving a 3D display apparatus as claimed in claim 14, further comprising performing one inversion of a frame inversion, vertical line inversion, horizontal line inversion, and a dot inversion in at least one frame period.

22. The method of driving a 3D display apparatus as claimed in claim 13, further comprising:
capturing an image of a user; and
sensing a position of the user by using data from the captured image,
wherein, if the position of the user changes and a movement of the user is detected, the driving step sequentially drives the plurality of upper electrodes and the plurality of lower electrodes so that positions of the light transmitting areas are shifted corresponding to a direction of the movement.

23. The method of driving a 3D display apparatus as claimed in claim 22, wherein the plurality of upper electrodes and the plurality of lower electrodes are arranged so that predetermined areas of the upper electrodes and the lower electrodes overlap each other through the liquid crystal layer interposed between the upper electrodes and the lower electrodes.

24. The method of driving a 3D display apparatus as claimed in claim 23, wherein the driving step sequentially performs supplying a driving signal to one of a first upper electrode connector, a second upper electrode connector, a first lower electrode connector, and a second lower electrode connector, which are provided in the barrier, and grounding the remaining electrode connectors,
wherein the first upper electrode connector is formed on one side of the plurality of upper electrodes to electrically connect odd-numbered upper electrodes of the plurality of upper electrodes,
the second upper electrode connector is formed on the other side of the plurality of upper electrodes to electrically connect even-numbered upper electrodes of the plurality of upper electrodes,
the first lower electrode connector is formed on one side of the plurality of lower electrodes to electrically connect odd-numbered lower electrodes of the plurality of lower electrodes, and
the second lower electrode connector is formed on the other side of the plurality of lower electrodes to electrically connect even-numbered lower electrodes of the plurality of lower electrodes.

25. A barrier for use in a display apparatus comprising:
a liquid crystal layer;
a plurality of upper electrodes, which are linearity arranged on an upper surface of the liquid crystal layer forming an upper electrode layer, and which are horizontally spaced apart from one another;
a plurality of lower electrodes, which are linearly arranged on a lower surface of the liquid crystal layer forming a lower electrode layer and which are horizontally spaced apart from one another; and
a controller which controls the plurality of upper electrodes and the plurality of lower electrodes to allow light transmission from light transmission areas of the barrier and block light from light blocking areas of the barrier and controls the plurality of upper electrodes and the plurality of lower electrodes to shift the light transmission areas and light blocking area,
wherein the liquid crystal layer is disposed between the upper electrode layer and the lower electrode layer.

26. The barrier as claimed in claim 25, wherein an area of at least one of the plurality of upper electrodes and an area of at least one of the plurality of lower electrodes overlap each other through the liquid crystal layer.

27. The barrier as claimed in claim 26, further comprising:
a first upper electrode connector formed on one side of the plurality of upper electrodes to electrically connect odd-numbered upper electrodes of the plurality of upper electrodes;
a second upper electrode connector formed on the other side of the plurality of upper electrodes to electrically connect even-numbered upper electrodes of the plurality of upper electrodes;
a first lower electrode connector formed on one side of the plurality of lower electrodes to electrically connect odd-numbered lower electrodes of the plurality of lower electrodes; and
a second lower electrode connector formed on the other side of the plurality of lower electrodes to electrically connect even-numbered lower electrodes of the plurality of lower electrodes.

* * * * *